(12) United States Patent
Chai

(10) Patent No.: US 8,952,892 B2
(45) Date of Patent: Feb. 10, 2015

(54) INPUT LOCATION CORRECTION TABLES FOR INPUT PANELS

(71) Applicant: Microsoft Corporation, Redmond, WA (US)

(72) Inventor: Min Chin Chai, Lynnwood, WA (US)

(73) Assignee: Microsoft Corporation, Redmond, WA (US)

( * ) Notice: Subject to any disclaimer, the term of this patent is extended or adjusted under 35 U.S.C. 154(b) by 199 days.

(21) Appl. No.: 13/666,958

(22) Filed: Nov. 1, 2012

(65) Prior Publication Data

US 2014/0118241 A1    May 1, 2014

(51) Int. Cl.
*G09G 5/00*    (2006.01)

(52) U.S. Cl.
USPC .......................................................... 345/156

(58) Field of Classification Search
None
See application file for complete search history.

(56) References Cited

U.S. PATENT DOCUMENTS

| | | | |
|---|---|---|---|
| 4,046,975 A | 9/1977 | Seeger, Jr. |
| 4,065,649 A | 12/1977 | Carter et al. |
| 4,086,451 A | 4/1978 | Boulanger |
| 4,243,861 A | 1/1981 | Strandwitz |
| 4,302,648 A | 11/1981 | Sado et al. |
| 4,317,013 A | 2/1982 | Larson |
| 4,365,130 A | 12/1982 | Christensen |
| 4,492,829 A | 1/1985 | Rodrique |
| 4,527,021 A | 7/1985 | Morikawa et al. |
| 4,559,426 A | 12/1985 | Van Zeeland et al. |
| 4,588,187 A | 5/1986 | Dell |
| 4,607,147 A | 8/1986 | Ono et al. |
| 4,651,133 A | 3/1987 | Ganesan et al. |
| 5,008,497 A | 4/1991 | Asher |
| 5,220,521 A | 6/1993 | Kikinis |
| 5,283,559 A | 2/1994 | Kalendra et al. |
| 5,331,443 A | 7/1994 | Stanisci |
| 5,548,477 A | 8/1996 | Kumar et al. |
| 5,558,577 A | 9/1996 | Kato |

(Continued)

FOREIGN PATENT DOCUMENTS

| EP | 2026178 | 2/2009 |
|---|---|---|
| EP | 2353978 | 8/2011 |

(Continued)

OTHER PUBLICATIONS

"Accessing Device Sensors", retrieved from <https://developer.palm.com/content/api/dev-guide/pdk/accessing-device-sensors.html> on May 25, 2012, 4 pages.

(Continued)

*Primary Examiner* — Kent Chang
*Assistant Examiner* — Nathan Brittingham
(74) *Attorney, Agent, or Firm* — Jeremy Snodgrass; Judy Yee; Micky Minhas

(57) ABSTRACT

One or more input location correction tables are used to compensate for interference introduced into input panels and generate a corrected location based on a sensed location of the input panel. The one or more input location correction tables can include a coarse table and a fine table that stores mappings of intermediate locations mapped to by the coarse table having an accuracy that fails to satisfy a threshold coordinate accuracy. Different environments in which computing device can be situated can result in different interference being introduced, and the one or more input location correction tables can be updated based on the current environment to compensate for the interference introduced in the current environment.

20 Claims, 11 Drawing Sheets

(56) References Cited

U.S. PATENT DOCUMENTS

| | | |
|---|---|---|
| 5,618,232 A | 4/1997 | Martin |
| 5,666,112 A | 9/1997 | Crowley et al. |
| 5,681,220 A | 10/1997 | Bertram et al. |
| 5,745,376 A | 4/1998 | Barker et al. |
| 5,748,114 A | 5/1998 | Koehn |
| 5,781,406 A | 7/1998 | Hunte |
| 5,807,175 A | 9/1998 | Davis et al. |
| 5,818,361 A | 10/1998 | Acevedo |
| 5,828,770 A | 10/1998 | Leis et al. |
| 5,874,697 A | 2/1999 | Selker et al. |
| 5,924,555 A | 7/1999 | Sadamori et al. |
| 5,926,170 A | 7/1999 | Oba |
| 5,971,635 A | 10/1999 | Wise |
| 6,002,389 A | 12/1999 | Kasser |
| 6,005,209 A | 12/1999 | Burleson et al. |
| 6,012,714 A | 1/2000 | Worley et al. |
| 6,040,823 A | 3/2000 | Seffernick et al. |
| 6,044,717 A | 4/2000 | Biegelsen et al. |
| 6,061,644 A | 5/2000 | Leis |
| 6,112,797 A | 9/2000 | Colson et al. |
| 6,178,443 B1 | 1/2001 | Lin |
| 6,254,105 B1 | 7/2001 | Rinde et al. |
| 6,279,060 B1 | 8/2001 | Luke et al. |
| 6,329,617 B1 | 12/2001 | Burgess |
| 6,344,791 B1 | 2/2002 | Armstrong |
| 6,380,497 B1 | 4/2002 | Hashimoto et al. |
| 6,437,682 B1 | 8/2002 | Vance |
| 6,506,983 B1 | 1/2003 | Babb et al. |
| 6,511,378 B1 | 1/2003 | Bhatt et al. |
| 6,532,147 B1 | 3/2003 | Christ, Jr. |
| 6,543,949 B1 | 4/2003 | Ritchey et al. |
| 6,565,439 B2 | 5/2003 | Shinohara et al. |
| 6,600,121 B1 | 7/2003 | Olodort et al. |
| 6,603,408 B1 | 8/2003 | Gaba |
| 6,603,461 B2 | 8/2003 | Smith, Jr. et al. |
| 6,617,536 B2 | 9/2003 | Kawaguchi |
| 6,684,166 B2 | 1/2004 | Bellwood et al. |
| 6,685,369 B2 | 2/2004 | Lien |
| 6,704,864 B1 | 3/2004 | Philyaw |
| 6,721,019 B2 | 4/2004 | Kono et al. |
| 6,725,318 B1 | 4/2004 | Sherman et al. |
| 6,774,888 B1 | 8/2004 | Genduso |
| 6,776,546 B2 | 8/2004 | Kraus et al. |
| 6,784,869 B1 | 8/2004 | Clark et al. |
| 6,798,887 B1 | 9/2004 | Andre |
| 6,813,143 B2 | 11/2004 | Makela |
| 6,819,316 B2 | 11/2004 | Schulz et al. |
| 6,856,506 B2 | 2/2005 | Doherty et al. |
| 6,861,961 B2 | 3/2005 | Sandbach et al. |
| 6,898,315 B2 | 5/2005 | Guha |
| 6,909,354 B2 | 6/2005 | Baker et al. |
| 6,914,197 B2 | 7/2005 | Doherty et al. |
| 6,950,950 B2 | 9/2005 | Sawyers et al. |
| 6,970,957 B1 | 11/2005 | Oshins et al. |
| 6,976,799 B2 | 12/2005 | Kim et al. |
| 7,051,149 B2 | 5/2006 | Wang et al. |
| 7,083,295 B1 | 8/2006 | Hanna |
| 7,091,436 B2 | 8/2006 | Serban |
| 7,106,222 B2 | 9/2006 | Ward et al. |
| 7,123,292 B1 | 10/2006 | Seeger et al. |
| 7,194,662 B2 | 3/2007 | Do et al. |
| 7,213,991 B2 | 5/2007 | Chapman et al. |
| 7,277,087 B2 | 10/2007 | Hill et al. |
| 7,447,934 B2 | 11/2008 | Dasari et al. |
| 7,469,386 B2 | 12/2008 | Bear et al. |
| 7,499,037 B2 | 3/2009 | Lube |
| 7,502,803 B2 | 3/2009 | Culter et al. |
| 7,542,052 B2 | 6/2009 | Solomon et al. |
| 7,558,594 B2 | 7/2009 | Wilson |
| 7,559,834 B1 | 7/2009 | York |
| 7,620,244 B1 | 11/2009 | Collier |
| 7,636,921 B2 | 12/2009 | Louie |
| 7,639,876 B2 | 12/2009 | Clary et al. |
| 7,656,392 B2 | 2/2010 | Bolender |
| 7,733,326 B1 | 6/2010 | Adiseshan |
| 7,773,076 B2 | 8/2010 | Pittel et al. |
| 7,777,972 B1 | 8/2010 | Chen et al. |
| 7,782,342 B2 | 8/2010 | Koh |
| 7,813,715 B2 | 10/2010 | McKillop et al. |
| 7,884,807 B2 | 2/2011 | Hovden et al. |
| D636,397 S | 4/2011 | Green |
| 7,928,964 B2 | 4/2011 | Kolmykov-Zotov et al. |
| 7,945,717 B2 | 5/2011 | Rivalsi |
| 7,973,771 B2 | 7/2011 | Geaghan |
| 7,978,281 B2 | 7/2011 | Vergith et al. |
| 8,026,904 B2 | 9/2011 | Westerman |
| 8,053,688 B2 | 11/2011 | Conzola et al. |
| 8,065,624 B2 | 11/2011 | Morin et al. |
| 8,069,356 B2 | 11/2011 | Rathi et al. |
| 8,077,160 B2 | 12/2011 | Land et al. |
| 8,130,203 B2 | 3/2012 | Westerman |
| 8,154,524 B2 | 4/2012 | Wilson et al. |
| D659,139 S | 5/2012 | Gengler |
| 8,169,421 B2 | 5/2012 | Wright et al. |
| 8,229,509 B2 | 7/2012 | Paek et al. |
| 8,229,522 B2 | 7/2012 | Kim et al. |
| 8,346,206 B1 | 1/2013 | Andrus et al. |
| 8,674,941 B2 | 3/2014 | Casparian et al. |
| 8,791,382 B2 | 7/2014 | Whitt, III et al. |
| 8,825,187 B1 | 9/2014 | Hamrick et al. |
| 2002/0005108 A1 | 1/2002 | Ludwig |
| 2002/0134828 A1 | 9/2002 | Sandbach et al. |
| 2002/0135457 A1 | 9/2002 | Sandbach et al. |
| 2003/0007648 A1 | 1/2003 | Currell |
| 2003/0051983 A1 | 3/2003 | Lahr |
| 2003/0067450 A1 | 4/2003 | Thursfield et al. |
| 2003/0197687 A1 | 10/2003 | Shetter |
| 2004/0095333 A1 | 5/2004 | Morag et al. |
| 2004/0113956 A1 | 6/2004 | Bellwood et al. |
| 2004/0258924 A1 | 12/2004 | Berger et al. |
| 2004/0268000 A1 | 12/2004 | Barker et al. |
| 2005/0057515 A1 | 3/2005 | Bathiche |
| 2005/0059489 A1 | 3/2005 | Kim |
| 2005/0146512 A1 | 7/2005 | Hill et al. |
| 2005/0264653 A1 | 12/2005 | Starkweather et al. |
| 2005/0264988 A1 | 12/2005 | Nicolosi |
| 2005/0283731 A1 | 12/2005 | Saint-Hilaire et al. |
| 2005/0285703 A1 | 12/2005 | Wheeler et al. |
| 2006/0049920 A1 | 3/2006 | Sadler et al. |
| 2006/0085658 A1 | 4/2006 | Allen et al. |
| 2006/0092139 A1 | 5/2006 | Sharma |
| 2006/0096392 A1 | 5/2006 | Inkster et al. |
| 2006/0125799 A1 | 6/2006 | Hillis et al. |
| 2006/0152499 A1* | 7/2006 | Roberts .................. 345/173 |
| 2006/0154725 A1 | 7/2006 | Glaser et al. |
| 2006/0156415 A1 | 7/2006 | Rubinstein et al. |
| 2006/0181514 A1 | 8/2006 | Newman |
| 2006/0192763 A1 | 8/2006 | Ziemkowski |
| 2006/0195522 A1 | 8/2006 | Miyazaki |
| 2006/0267931 A1 | 11/2006 | Vainio et al. |
| 2006/0272429 A1 | 12/2006 | Ganapathi et al. |
| 2007/0062089 A1 | 3/2007 | Homer et al. |
| 2007/0072474 A1 | 3/2007 | Beasley et al. |
| 2007/0121956 A1 | 5/2007 | Bai et al. |
| 2007/0178891 A1 | 8/2007 | Louch et al. |
| 2007/0182663 A1 | 8/2007 | Biech |
| 2007/0185590 A1 | 8/2007 | Reindel et al. |
| 2007/0234420 A1 | 10/2007 | Novotney et al. |
| 2007/0236408 A1 | 10/2007 | Yamaguchi et al. |
| 2007/0247432 A1 | 10/2007 | Oakley |
| 2007/0260892 A1 | 11/2007 | Paul et al. |
| 2007/0283179 A1 | 12/2007 | Burnett et al. |
| 2007/0296709 A1 | 12/2007 | Guanghai |
| 2007/0297625 A1 | 12/2007 | Hjort et al. |
| 2008/0005423 A1 | 1/2008 | Jacobs et al. |
| 2008/0053222 A1 | 3/2008 | Ehrensvard et al. |
| 2008/0104437 A1 | 5/2008 | Lee |
| 2008/0129520 A1 | 6/2008 | Lee |
| 2008/0151478 A1 | 6/2008 | Chern |
| 2008/0158185 A1 | 7/2008 | Westerman |
| 2008/0167832 A1 | 7/2008 | Soss |
| 2008/0238884 A1 | 10/2008 | Harish |
| 2008/0253822 A1 | 10/2008 | Matias |
| 2008/0309636 A1 | 12/2008 | Feng et al. |

(56) References Cited

U.S. PATENT DOCUMENTS

| | | |
|---|---|---|
| 2008/0316002 A1 | 12/2008 | Brunet et al. |
| 2008/0320190 A1 | 12/2008 | Lydon et al. |
| 2009/0009476 A1 | 1/2009 | Daley, III |
| 2009/0073957 A1 | 3/2009 | Newland et al. |
| 2009/0127005 A1 | 5/2009 | Zachut et al. |
| 2009/0140985 A1 | 6/2009 | Liu |
| 2009/0251008 A1 | 10/2009 | Sugaya |
| 2009/0262492 A1 | 10/2009 | Whitchurch et al. |
| 2009/0303204 A1 | 12/2009 | Nasiri et al. |
| 2009/0320244 A1 | 12/2009 | Lin |
| 2009/0321490 A1 | 12/2009 | Groene et al. |
| 2010/0001963 A1 | 1/2010 | Doray et al. |
| 2010/0023869 A1 | 1/2010 | Saint-Hilaire et al. |
| 2010/0026656 A1 | 2/2010 | Hotelling et al. |
| 2010/0038821 A1 | 2/2010 | Jenkins et al. |
| 2010/0045609 A1 | 2/2010 | Do et al. |
| 2010/0045633 A1 | 2/2010 | Gettemy |
| 2010/0051356 A1 | 3/2010 | Stern et al. |
| 2010/0051432 A1 | 3/2010 | Lin et al. |
| 2010/0053534 A1 | 3/2010 | Hsieh et al. |
| 2010/0054435 A1 | 3/2010 | Louch et al. |
| 2010/0056130 A1 | 3/2010 | Louch et al. |
| 2010/0073329 A1 | 3/2010 | Raman et al. |
| 2010/0077237 A1 | 3/2010 | Sawyers |
| 2010/0079379 A1 | 4/2010 | Demuynck et al. |
| 2010/0081377 A1 | 4/2010 | Chatterjee et al. |
| 2010/0085321 A1 | 4/2010 | Pundsack |
| 2010/0103112 A1 | 4/2010 | Yoo et al. |
| 2010/0148999 A1 | 6/2010 | Casparian et al. |
| 2010/0149104 A1 | 6/2010 | Sim et al. |
| 2010/0149111 A1 | 6/2010 | Olien |
| 2010/0149134 A1 | 6/2010 | Westerman et al. |
| 2010/0156798 A1 | 6/2010 | Archer |
| 2010/0161522 A1 | 6/2010 | Tirpak et al. |
| 2010/0164857 A1 | 7/2010 | Liu et al. |
| 2010/0171891 A1 | 7/2010 | Kaji et al. |
| 2010/0174421 A1 | 7/2010 | Tsai et al. |
| 2010/0180063 A1 | 7/2010 | Ananny et al. |
| 2010/0188299 A1 | 7/2010 | Rinehart et al. |
| 2010/0206614 A1 | 8/2010 | Park et al. |
| 2010/0206644 A1 | 8/2010 | Yeh |
| 2010/0214257 A1 | 8/2010 | Wussler et al. |
| 2010/0222110 A1 | 9/2010 | Kim et al. |
| 2010/0231556 A1 | 9/2010 | Mines et al. |
| 2010/0250988 A1 | 9/2010 | Okuda et al. |
| 2010/0265182 A1 | 10/2010 | Ball et al. |
| 2010/0274932 A1 | 10/2010 | Kose |
| 2010/0279768 A1 | 11/2010 | Huang et al. |
| 2010/0289457 A1 | 11/2010 | Onnerud et al. |
| 2010/0295812 A1 | 11/2010 | Burns et al. |
| 2010/0302378 A1 | 12/2010 | Marks et al. |
| 2010/0304793 A1 | 12/2010 | Kim |
| 2010/0306538 A1 | 12/2010 | Thomas et al. |
| 2010/0308778 A1 | 12/2010 | Yamazaki et al. |
| 2010/0308844 A1 | 12/2010 | Day et al. |
| 2010/0313680 A1 | 12/2010 | Joung et al. |
| 2010/0315348 A1 | 12/2010 | Jellicoe et al. |
| 2010/0315373 A1 | 12/2010 | Steinhauser et al. |
| 2010/0324457 A1 | 12/2010 | Bean et al. |
| 2010/0325155 A1 | 12/2010 | Skinner et al. |
| 2010/0331059 A1 | 12/2010 | Apgar et al. |
| 2011/0012873 A1 | 1/2011 | Prest et al. |
| 2011/0019123 A1 | 1/2011 | Prest et al. |
| 2011/0031287 A1 | 2/2011 | Le Gette et al. |
| 2011/0032127 A1 | 2/2011 | Roush |
| 2011/0037721 A1 | 2/2011 | Cranfill et al. |
| 2011/0043990 A1 | 2/2011 | Mickey et al. |
| 2011/0050576 A1 | 3/2011 | Forutanpour et al. |
| 2011/0060926 A1 | 3/2011 | Brooks et al. |
| 2011/0069148 A1 | 3/2011 | Jones et al. |
| 2011/0074688 A1 | 3/2011 | Hull et al. |
| 2011/0102326 A1 | 5/2011 | Casparian et al. |
| 2011/0102356 A1 | 5/2011 | Kemppinen et al. |
| 2011/0107958 A1 | 5/2011 | Pance et al. |
| 2011/0113368 A1 | 5/2011 | Carvajal et al. |
| 2011/0115738 A1 | 5/2011 | Suzuki et al. |
| 2011/0134032 A1 | 6/2011 | Chiu et al. |
| 2011/0163955 A1 | 7/2011 | Nasiri et al. |
| 2011/0164370 A1 | 7/2011 | McClure et al. |
| 2011/0167181 A1 | 7/2011 | Minoo et al. |
| 2011/0167287 A1 | 7/2011 | Walsh et al. |
| 2011/0167391 A1 | 7/2011 | Momeyer et al. |
| 2011/0167992 A1 | 7/2011 | Eventoff et al. |
| 2011/0179864 A1 | 7/2011 | Raasch et al. |
| 2011/0184646 A1 | 7/2011 | Wong et al. |
| 2011/0193787 A1 | 8/2011 | Morishige et al. |
| 2011/0205372 A1 | 8/2011 | Miramontes |
| 2011/0221678 A1 | 9/2011 | Davydov |
| 2011/0227913 A1 | 9/2011 | Hyndman |
| 2011/0242138 A1 | 10/2011 | Tribble |
| 2011/0248920 A1 | 10/2011 | Larsen |
| 2011/0248941 A1 | 10/2011 | Abdo et al. |
| 2011/0267272 A1 | 11/2011 | Meyer et al. |
| 2011/0290686 A1 | 12/2011 | Huang |
| 2011/0297566 A1 | 12/2011 | Gallagher et al. |
| 2011/0304577 A1 | 12/2011 | Brown |
| 2011/0310038 A1 | 12/2011 | Park et al. |
| 2011/0316807 A1 | 12/2011 | Corrion |
| 2011/0320204 A1 | 12/2011 | Locker et al. |
| 2012/0002820 A1 | 1/2012 | Leichter |
| 2012/0007821 A1 | 1/2012 | Zaliva |
| 2012/0011462 A1 | 1/2012 | Westerman et al. |
| 2012/0020490 A1 | 1/2012 | Leichter |
| 2012/0023401 A1 | 1/2012 | Arscott et al. |
| 2012/0023459 A1 | 1/2012 | Westerman |
| 2012/0024682 A1 | 2/2012 | Huang et al. |
| 2012/0044179 A1 | 2/2012 | Hudson |
| 2012/0047368 A1 | 2/2012 | Chinn et al. |
| 2012/0050975 A1 | 3/2012 | Garelli et al. |
| 2012/0075249 A1 | 3/2012 | Hoch |
| 2012/0081316 A1 | 4/2012 | Sirpal et al. |
| 2012/0092279 A1 | 4/2012 | Martin |
| 2012/0094257 A1 | 4/2012 | Pillischer et al. |
| 2012/0099749 A1 | 4/2012 | Rubin et al. |
| 2012/0117409 A1 | 5/2012 | Lee et al. |
| 2012/0127118 A1 | 5/2012 | Nolting et al. |
| 2012/0139727 A1 | 6/2012 | Houvener et al. |
| 2012/0140396 A1 | 6/2012 | Zeliff et al. |
| 2012/0145525 A1 | 6/2012 | Ishikawa |
| 2012/0162693 A1 | 6/2012 | Ito |
| 2012/0182242 A1 | 7/2012 | Lindahl et al. |
| 2012/0182249 A1 | 7/2012 | Endo et al. |
| 2012/0194448 A1 | 8/2012 | Rothkopf |
| 2012/0218194 A1 | 8/2012 | Silverman |
| 2012/0224073 A1 | 9/2012 | Miyahara |
| 2012/0242584 A1 | 9/2012 | Tuli |
| 2012/0246377 A1 | 9/2012 | Bhesania et al. |
| 2012/0250873 A1 | 10/2012 | Bakalos et al. |
| 2012/0256959 A1 | 10/2012 | Ye et al. |
| 2012/0260177 A1 | 10/2012 | Sehrer |
| 2012/0274811 A1 | 11/2012 | Bakin |
| 2012/0299872 A1 | 11/2012 | Nishikawa et al. |
| 2012/0300275 A1 | 11/2012 | Vilardell et al. |
| 2013/0044074 A1 | 2/2013 | Park et al. |
| 2013/0063873 A1 | 3/2013 | Wodrich et al. |
| 2013/0067126 A1 | 3/2013 | Casparian et al. |
| 2013/0069916 A1* | 3/2013 | Esteve .......................... 345/177 |
| 2013/0082824 A1 | 4/2013 | Colley |
| 2013/0082950 A1* | 4/2013 | Lim et al. ...................... 345/173 |
| 2013/0135214 A1 | 5/2013 | Li et al. |
| 2013/0191741 A1 | 7/2013 | Dickinson et al. |
| 2013/0217451 A1 | 8/2013 | Komiyama et al. |
| 2013/0228023 A1 | 9/2013 | Drasnin |
| 2013/0228433 A1 | 9/2013 | Shaw |
| 2013/0228439 A1 | 9/2013 | Whitt, III |
| 2013/0229347 A1 | 9/2013 | Lutz, III |
| 2013/0229350 A1 | 9/2013 | Shaw |

(56) References Cited

U.S. PATENT DOCUMENTS

| | | | |
|---|---|---|---|
| 2013/0229758 | A1 | 9/2013 | Belesiu |
| 2013/0230346 | A1 | 9/2013 | Shaw |
| 2013/0300590 | A1 | 11/2013 | Dietz |

FOREIGN PATENT DOCUMENTS

| | | |
|---|---|---|
| GB | 2123213 | 1/1984 |
| JP | 56108127 | 8/1981 |
| JP | 10326124 | 12/1998 |
| JP | 2010244514 | 10/2010 |
| KR | 20090029411 | 3/2009 |
| KR | 20100067366 | 6/2010 |
| KR | 20110120002 | 11/2011 |
| WO | WO-2014084880 | 6/2014 |

OTHER PUBLICATIONS

"ACPI Docking for Windows Operating Systems", Retrieved from: <http://www.scritube.com/limba/engleza/software/ACPI-Docking-for-Windows-Opera331824193.php> on Jul. 6, 2012,10 pages.

"Cholesteric Liquid Crystal", Retrieved from: <http://en.wikipedia.org/wiki/Cholesteric_liquid_crystal> on Aug. 6, 2012,(Jun. 10, 2012), 2 pages.

"Cirago Slim Case®—Protective case with built-in kickstand for your iPhone 5®", Retrieved from <http://cirago.com/wordpress/wp-content/uploads/2012/10/ipc1500brochure1.pdf> on Jan. 29, 2013, 1 page.

"DR2PA", retrieved from <http://www.architainment.co.uk/wp-content/uploads/2012/08/DR2PA-AU-US-size-Data-Sheet-Rev-H_Logo.pdf> on Sep. 17, 2012, 4 pages.

"First One Handed Fabric Keyboard with Bluetooth Wireless Technology", Retrieved from: <http://press.xtvworld.com/article3817.html> on May 8, 2012,(Jan. 6, 2005), 2 pages.

"Force and Position Sensing Resistors: An Emerging Technology", *Interlink Electronics*, Available at <http://staff.science.uva.nl/~vlaander/docu/FSR/An_Exploring_Technology.pdf>,(Feb. 1990), pp. 1-6.

"Frogpad Introduces Weareable Fabric Keyboard with Bluetooth Technology", Retrieved from: <http://www.geekzone.co.nz/content.asp?contentid=3898> on May 7, 2012,(Jan. 7, 2005), 3 pages.

"How to Use the iPad's Onscreen Keyboard", Retrieved from <http://www.dummies.com/how-to/content/how-to-use-the-ipads-onscreen-keyboard.html> on Aug. 28, 2012, 3 pages.

"i-Interactor electronic pen", Retrieved from: <http://www.alibaba.com/product-gs/331004878/i_Interactor_electronic_pen.html> on Jun. 19, 2012,5 pages.

"Incipio LG G-Slate Premium Kickstand Case—Black Nylon", Retrieved from: <http://www.amazon.com/Incipio-G-Slate-Premium-Kickstand-Case/dp/B004ZKP916> on May 8, 2012, 4 pages.

"Membrane Keyboards & Membrane Keypads", Retrieved from: <http://www.pannam.com/> on May 9, 2012,(Mar. 4, 2009), 2 pages.

"Motion Sensors", *Android Developers*, retrieved from <http://developer.android.com/guide/topics/sensors/sensors_motion.html> on May 25, 2012,7 pages.

"MPC Fly Music Production Controller", *AKAI Professional*, Retrieved from: <http://www.akaiprompc.com/mpc-fly> on Jul. 9, 2012, 4 pages.

"NI Releases New Maschine & Maschine Mikro", Retrieved from <http://www.djbooth.net/index/dj-equipment/entry/ni-releases-new-maschine-mikro/> on Sep. 17, 2012, 19 pages.

"Non-Final Office Action", U.S. Appl. No. 13/471,001, (Feb. 19, 2013),15 pages.

"Non-Final Office Action", U.S. Appl. No. 13/471,139, (Mar. 21, 2013),12 pages.

"Non-Final Office Action",U.S. Appl. No. 13/471,202, (Feb. 11, 2013),10 pages.

"Non-Final Office Action", U.S. Appl. No. 13/471,336, (Jan. 18, 2013),14 pages.

"Non-Final Office Action", U.S. Appl. No. 13/651,195, (Jan. 2, 2013),14 pages.

"Non-Final Office Action", U.S. Appl. No. 13/651,232, (Jan. 17, 2013),15 pages.

"Non-Final Office Action", U.S. Appl. No. 13/651,272, (Feb. 12, 2013),10 pages.

"Non-Final Office Action", U.S. Appl. No. 13/651,287, (Jan. 29, 2013),13 pages.

"Non-Final Office Action", U.S. Appl. No. 13/651,304, (Mar. 22, 2013), 9 pages.

"Non-Final Office Action", U.S. Appl. No. 13/651,327, (Mar. 22, 2013), 6 pages.

"Non-Final Office Action", U.S. Appl. No. 13/651,871, (Mar. 18, 2013),14 pages.

"Non-Final Office Action", U.S. Appl. No. 13/651,976, (Feb. 22, 2013),16 pages.

"Non-Final Office Action", U.S. Appl. No. 13/653,321, (Feb. 1, 2013),13 pages.

"Non-Final Office Action", U.S. Appl. No. 13/653,682, (Feb. 7, 2013),11 pages.

"Notice of Allowance", U.S. Appl. No. 13/470,633, (Mar. 22, 2013), 7 pages.

"On-Screen Keyboard for Windows 7, Vista, XP with Touchscreen", Retrieved from <www.comfort-software.com/on-screen-keyboard.html> on Aug. 28, 2012, (Feb. 2, 2011), 3 pages.

"Position Sensors", *Android Developers*, retrieved from <http://developer.android.com/guide/topics/sensors/sensors_position.html> on May 25, 2012, 5 pages.

"Reflex LCD Writing Tablets", retrieved from <http://www.kentdisplays.com/products/lcdwritingtablets.html> on Jun. 27, 2012, 3 pages.

"Restriction Requirement", U.S. Appl. No. 13/471,139, (Jan. 17, 2013), 7 pages.

"Restriction Requirement", U.S. Appl. No. 13/651,304, (Jan. 18, 2013), 7 pages.

"Restriction Requirement", U.S. Appl. No. 13/651,726, (Feb. 22, 2013), 6 pages.

"Restriction Requirement", U.S. Appl. No. 13/651,871, (Feb. 7, 2013), 6 pages.

"Smart Board™ Interactive Display Frame Pencil Pack", Available at <http://downloads01.smarttech.com/media/sitecore/en/support/product/sbfpd/400series(interactivedisplayframes)/guides/smartboardinteractivedisplayframepencilpackv12mar09.pdf>,(2009), 2 pages.

"SolRx™ E-Series Multidirectional Phototherapy Expandable™ 2-Bulb Full Body Panel System", Retrieved from: <http://www.solarcsystems.com/us_multidirectional_uv_light_therapy_1_intro.html > on Jul. 25, 2012,(2011), 4 pages.

"The Microsoft Surface Tablets Comes With Impressive Design and Specs", Retrieved from <http://microsofttabletreview.com/the-microsoft-surface-tablets-comes-with-impressive-design-and-specs> on Jan. 30, 2013, (Jun. 2012), 2 pages.

"Tilt Shift Lenses: Perspective Control", retrieved from http://www.cambridgeincolour.com/tutorials/tilt-shift-lenses1.htm, (Mar. 28, 2008), 11 pages.

"Virtualization Getting Started Guide", *Red Hat Enterprise Linux 6, Edition 0.2*, retrieved from <http://docs.redhat.com/docs/en-US/Red_Hat_Enterprise_Linux/6/html-single/Virtualization_Getting_Started_Guide/index.html> on Jun. 13, 2012, 24 pages.

"What is Active Alignment?", http://www.kasalis.com/active_alignment.html, retrieved on Nov. 22, 2012, 2 Pages.

Block, Steve et al., "DeviceOrientation Event Specification", *W3C, Editor's Draft*, retrieved from <https://developer.palm.com/content/api/dev-guide/pdk/accessing-device-sensors.html> on May 25, 2012,(Jul. 12, 2011),14 pages.

Brown, Rich "Microsoft Shows Off Pressure-Sensitive Keyboard", retrieved from <http://news.cnet.com/8301-17938_105-10304792-1.html> on May 7, 2012, (Aug. 6, 2009), 2 pages.

Butler, Alex et al., "SideSight: Multi-"touch" Interaction around Small Devices", *In the proceedings of the 21st annual ACM symposium on User interface software and technology.*, retrieved from <http://research.microsoft.com/pubs/132534/sidesight_crv3.pdf> on May 29, 2013,(Oct. 19, 2008), 4 pages.

(56) References Cited

OTHER PUBLICATIONS

Crider, Michael "Sony Slate Concept Tablet "Grows" a Kickstand", Retrieved from: <http://androidcommunity.com/sony-slate-concept-tablet-grows-a-kickstand-20120116/> on May 4, 2012,(Jan. 16, 2012), 9 pages.
Das, Apurba et al., "Study of Heat Transfer through Multilayer Clothing Assemblies: A Theoretical Prediction", Retrieved from <http://www.autexrj.com/cms/zalaczone__pliki/5_013_11.pdf>, (Jun. 2011), 7 pages.
Dietz, Paul H., et al., "A Practical Pressure Sensitive Computer Keyboard", In Proceedings of UIST 2009,(Oct. 2009), 4 pages.
Glatt, Jeff "Channel and Key Pressure (Aftertouch).", Retrieved from: <http://home.roadrunner.com/~jgglatt/tutr/touch.htm> on Jun. 11, 2012, 2 pages.
Hanlon, Mike "ElekTex Smart Fabric Keyboard Goes Wireless", Retrieved from: <http://www.gizmag.com/go/5048/ > on May 7, 2012,(Jan. 15, 2006), 5 pages.
Iwase, Eiji "Multistep Sequential Batch Assembly of Three-Dimensional Ferromagnetic Microstructures with Elastic Hinges", Retrieved at <<http://ieeexplore.ieee.org/stamp/stamp.jsp?tp=&arnumber=1549861>> Proceedings: *Journal of Microelectromechanical Systems*, (Dec. 2005), 7 pages.
Kaur, Sukhmani "Vincent Liew's redesigned laptop satisfies ergonomic needs", Retrieved from: <http://www.designbuzz.com/entry/vincent-liew-s-redesigned-laptop-satisfies-ergonomic-needs/> on Jul. 27, 2012,(Jun. 21, 2010), 4 pages.
Khuntontong, Puttachat et al., "Fabrication of Molded Interconnection Devices by Ultrasonic Hot Embossing on Thin Polymer Films", IEEE Transactions on Electronics Packaging Manufacturing, vol. 32, No. 3,(Jul. 2009), pp. 152-156.
Linderholm, Owen "Logitech Shows Cloth Keyboard for PDAs", Retrieved from: <http://www.pcworld.com/article/89084/logitech_shows_cloth_keyboard_for_pdas.html> on May 7, 2012,(Mar. 15, 2002), 5 pages.
McLellan, Charles "Eleksen Wireless Fabric Keyboard: a first look", Retrieved from: <http://www.zdnetasia.com/eleksen-wireless-fabric-keyboard-a-first-look-40278954.htm> on May 7, 2012,(Jul. 17, 2006), 9 pages.
Piltch, Avram "ASUS Eee Pad Slider SL101 Review", Retrieved from <http://www.laptopmag.com/review/tablets/asus-eee-pad-slider-sl101.aspx>, (Sep. 22, 2011), 5 pages.
Post, E.R. et al., "E-Broidery: Design and Fabrication of Textile-Based Computing", IBM Systems Journal, vol. 39, Issue 3 & 4,(Jul. 2000), pp. 840-860.
Purcher, Jack "Apple is Paving the Way for a New 3D GUI for IOS Devices", Retrieved from: <http://www.patentlyapple.com/patently-apple/2012/01/apple-is-paving-the-way-for-a-new-3d-gui-for-ios-devices.html> on Jun. 4, 2012,(Jan. 12, 2012),15 pages.
Qin,Yongqiang et al., "pPen: Enabling Authenticated Pen and Touch Interaction on Tabletop Surfaces", *In Proceedings of ITS 2010*, Available at <http://www.dfki.de/its2010/papers/pdf/po172.pdf>,(Nov. 2010), pp. 283-284.
Sumimoto, Mark "Touch & Write: Surface Computing With Touch and Pen Input", Retrieved from: <http://www.gottabemobile.com/2009/08/07/touch-write-surface-computing-with-touch-and-pen-input/> on Jun. 19, 2012,(Aug. 7, 2009), 4 pages.
Takamatsu, Seiichi et al., "Flexible Fabric Keyboard with Conductive Polymer-Coated Fibers", In Proceedings of Sensors 2011,(Oct. 28, 2011), 4 pages.
Valliath, G T., "Design of Hologram for Brightness Enhancement in Color LCDs", Retrieved from <http://www.loreti.it/Download/PDF/LCD/44_05.pdf> on Sep. 17, 2012, 5 pages.
Williams, Jim "A Fourth Generation of LCD Backlight Technology", Retrieved from <http://cds.linear.com/docs/Application%20Note/an65f.pdf>, (Nov. 1995), 124 pages.
Zhang, et al., "Model-Based Development of Dynamically Adaptive Software", *In Proceedings of ICSE 2006*, Available at <http://www.irisa.fr/lande/lande/icse-proceedings/icse/p371.pdf>, (May 20, 2006), pp. 371-380.
"International Search Report and Written Opinion", Application No. PCT/US2013/067905, Apr. 15, 2014, 9 pages.
"Non-Final Office Action", U.S. Appl. No. 13/471,186, Feb. 27, 2014, 8 pages.
"Notice of Allowance", U.S. Appl. No. 13/471,139, Mar. 17, 2014, 4 pages.
"Notice of Allowance", U.S. Appl. No. 13/651,232, Apr. 25, 2014, 9 pages.
"Final Office Action", U.S. Appl. No. 13/651,232, (May 21, 2013), 21 pages.
"Final Office Action", U.S. Appl. No. 13/471,139, (Sep. 16, 2013),13 pages.
"Notice to Grant", CN Application No. 201320097089.9, (Sep. 29, 2013), 2 Pages.
"Notice to Grant", CN Application No. 201320097124.7, (Oct. 8, 2013), 2 pages.
"FingerWorks Installation and Operation Guide for the TouchStream ST and TouchStream LP", FingerWorks, Inc. Retrieved from <http://ec1.images-amazon.com/media/i3d/01/A/man-migrate/MANUAL000049862.pdf>, 2002, 14 pages.
"Non-Final Office Action", U.S. Appl. No. 13/651,232, filed Dec. 5, 2013, 15 pages.
"Non-Final Office Action", U.S. Appl. No. 13/468,918, filed Dec. 26, 2013, 18 pages.
"Restriction Requirement", U.S. Appl. No. 13/468,918, Nov. 29, 2013, 6 pages.
"Corrected Notice of Allowance", U.S. Appl. No. 13/651,232, Jul. 31, 2014, 2 pages.
"International Search Report and Written Opinion", Application No. PCT/US2013/028771, Jun. 19, 2014, 10 pages.
"International Search Report and Written Opinion", Application No. PCT/US2013/028767, Jun. 24, 2014, 11 pages.
"International Search Report and Written Opinion", Application No. PCT/US2013/028766, Jun. 26, 2014, 11 pages.
"International Search Report and Written Opinion", Application No. PCT/US2013/028487, May 27, 2014, 9 pages.
"International Search Report and Written Opinion", Application No. PCT/US2013/028770, Jun. 26, 2014, 9 pages.
"Non-Final Office Action", U.S. Appl. No. 13/468,882, Jul. 9, 2014, 9 pages.
"Non-Final Office Action", U.S. Appl. No. 13/468,949, Jun. 20, 2014, 10 pages.
"Notice of Allowance", U.S. Appl. No. 13/468,918, Jun. 17, 2014, 5 pages.
"Notice of Allowance", U.S. Appl. No. 13/471,186, Jul. 3, 2014, 7 pages.
"Final Office Action", U.S. Appl. No. 13/468,949, Oct. 6, 2014, 11 pages.
"Non-Final Office Action", U.S. Appl. No. 13/471,393, Oct. 20, 2014, 12 pages.
"Non-Final Office Action", U.S. Appl. No. 13/525,614, Nov. 24, 2014, 19 pages.
Harrison,"UIST 2009 Student Innovation Contest-Demo Video", Retrieved From: <https://www.youtube.com/watch?v=PDI8eYIASf0> Sep. 16, 2014, Jul. 23, 2009, 1 page.

* cited by examiner

1100

INPUT LOCATION CORRECTION TABLES FOR INPUT PANELS

BACKGROUND

Over time, the ways in which users can interact with computers have expanded. Where users were once limited to using keyboards to interact with computers, users can now interact with computers using different input mechanisms such as touch screens, track pads, and so forth. While these different input mechanisms are helpful to users, they are not without their problems. Once such problem is that some input mechanisms are adversely affected by interference in different situations. This interference can result in the location sensed using the input mechanism being different than the location intended to be input by the user, which can lead to a frustrating user experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a system includes a coarse correction table and a partial fine correction table. The coarse correction table stores mappings of sensed locations of an input panel to intermediate corrected locations that compensate for interference introduced into the input panel. The partial fine correction table stores mappings of particular intermediate corrected locations to corrected locations, the particular intermediate corrected locations being a subset of the intermediate corrected locations that have an accuracy that fails to satisfy a threshold coordinate accuracy. The system also includes a compensation control module that is configured to apply, to a sensed location of the input panel, the mappings of the coarse correction table and the mappings of the partial fine correction table to generate a corrected location that compensates for interference introduced to the input panel.

In accordance with one or more aspects, a current environment of an input panel is identified and a regional correction table corresponding to the current environment of the input panel is obtained. The regional correction table identifies changes to make to one or more baseline tables. The one or more baseline tables store mappings to generate, based on a sensed location of the input panel, a corrected location that compensates for interference introduced into the input panel. The one or more baseline tables are updated in accordance with the changes identified in the regional correction table.

BRIEF DESCRIPTION OF THE DRAWINGS

The same numbers are used throughout the drawings to reference like features.

DETAILED DESCRIPTION

Input location correction tables for input panels are discussed herein. Input panels can detect user inputs in different manners, such as by detecting the touch or position of a user's finger, by sensing the location of a stylus, and so forth. Interference can be introduced into an input panel by various different devices attached to the input panel (or attached to a computing device including the input panel) and/or various different devices in close proximity to the input panel. One or more input location correction tables are used to compensate for this interference and generate a corrected location based on a sensed location of the input panel. The one or more input location correction tables can include coarse and partial fine correction tables, the partial fine correction table storing mappings of intermediate locations mapped to by the coarse correction table that have an accuracy that fails to satisfy a threshold coordinate accuracy. Different environments (e.g., the presence or absence of a magnetically attached keyboard) in which the input panel can be situated can result in different interference being introduced, and the one or more input location correction tables can be updated based on a current environment to compensate for the interference introduced in the current environment.

Figure 1:
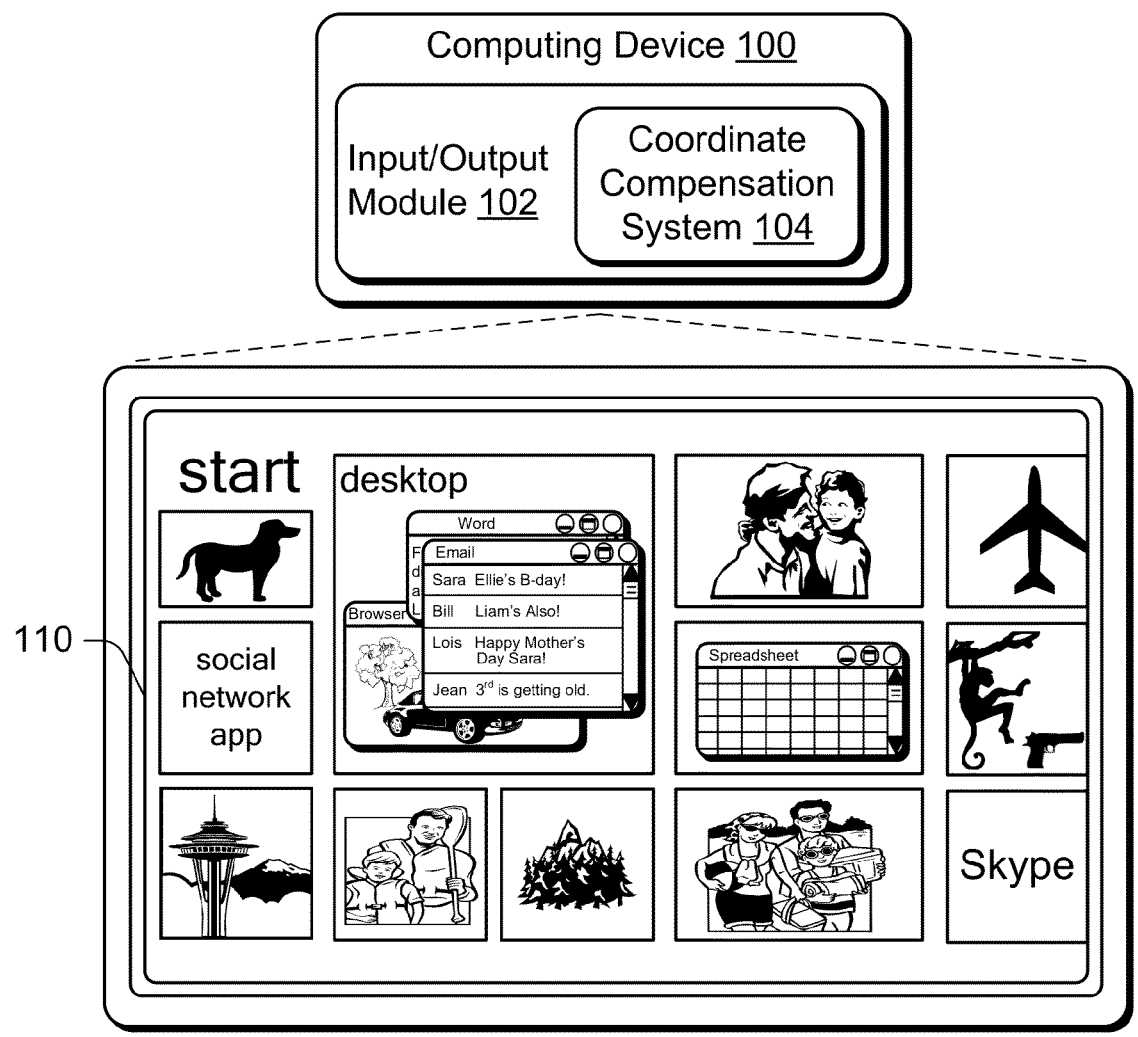
FIG. 1 illustrates an example computing device implementing the input location correction tables for input panels in accordance with one or more embodiments.

FIG. 1 illustrates an example computing device 100 implementing the input location correction tables for input panels in accordance with one or more embodiments. Computing device 100 can be configured for mobile use, such as a mobile phone, a tablet computer, a laptop or netbook computer, a game console, an automotive computer, and so on. However, the techniques discussed herein are also applicable to multiple types of devices other than those for mobile use, and can be used with any of a variety of different devices that use an input sensor. For example, computing device 100 can be a desktop computer, a point of sale kiosk, an interactive display or monitor (e.g., in a hospital, airport, mall, etc.), a server computer, a game console, and so forth. Computing device 100 can range from full resource devices with substantial memory and processor resources to low-resource devices with limited memory and/or processing resources. Computing device 100 can also relate to software that causes computing device 100 to perform one or more operations.

Computing device 100 is illustrated as including an input/output module 102 that includes a coordinate compensation system 104. Input/output module 102 is representative of functionality relating to processing of inputs and rendering outputs of computing device 100. A variety of different inputs may be processed by input/output module 102, such as inputs relating to functions that correspond to keys of an input device coupled to computing device 100 or keys of a virtual keyboard displayed by a display device 110 included as part of computing device 100, inputs that are gestures recognized through touchscreen functionality of display device 110 and that cause operations to be performed that correspond to the gestures, and so forth.

Display device 110 includes an input panel that senses user inputs. This input panel can take various forms, such as a touchscreen implemented using various different technologies as discussed in more detail below. Display device 110 is thus also referred to as an interactive display device due to the ability of the display device to receive user inputs. Interference can be introduced into the input panel by various different devices attached to computing device 100 and/or in close proximity to computing device 100. Coordinate compensation system 104 leverages the various techniques discussed herein to compensate for this interference, resulting in the locations of user inputs (e.g., touches or gestures along particular locations of the input panel) being accurately identified despite this interference.

Figure 2:
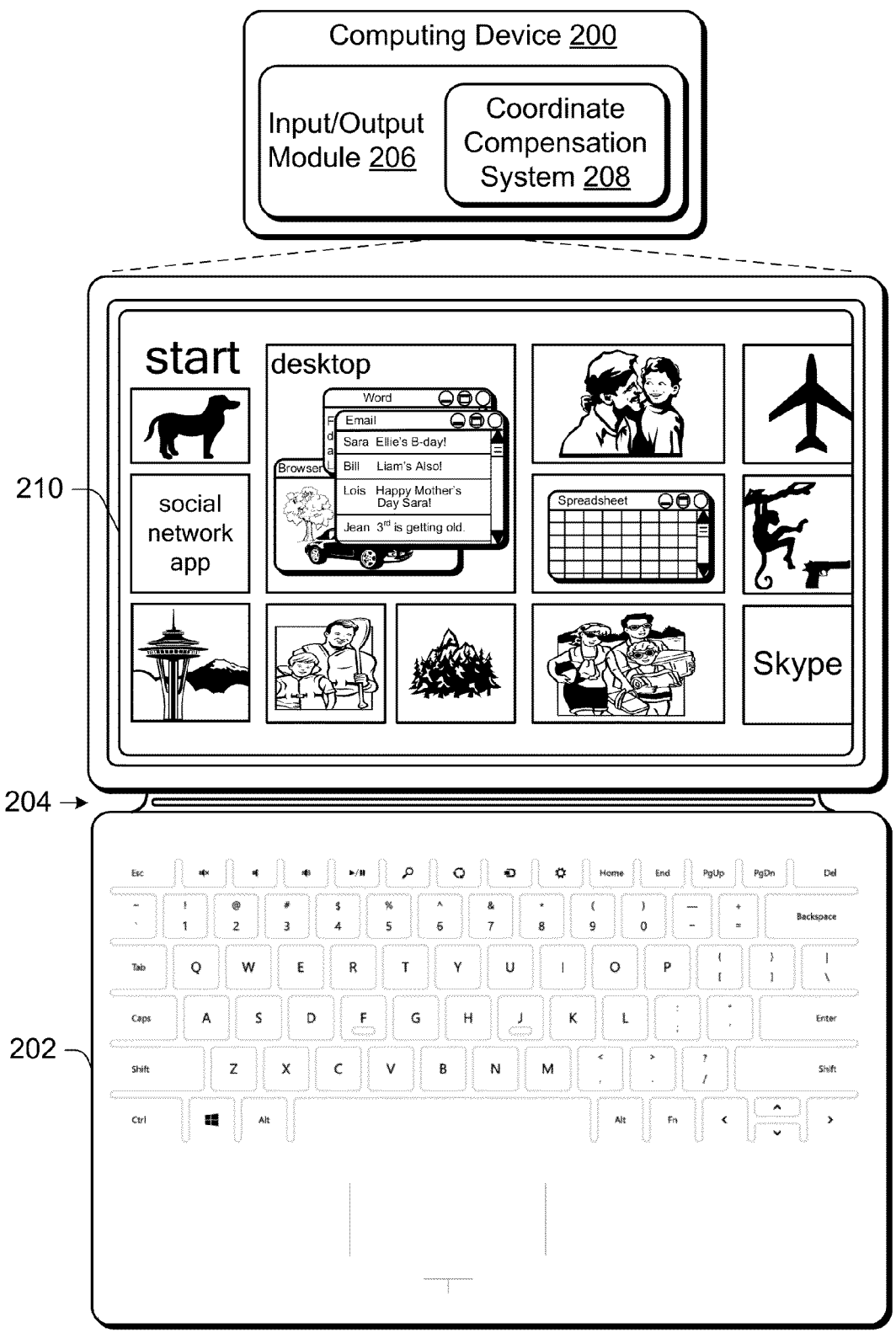
FIG. 2 illustrates another example computing device implementing the input location correction tables for input panels in accordance with one or more embodiments.

FIG. 2 illustrates another example computing device 200 implementing the input location correction tables for input panels in accordance with one or more embodiments. Computing device 200 is physically and communicatively coupled to an input device 202 via a flexible hinge 204. Computing device 200 may be configured in a variety of ways, analogous to computing device 100 of FIG. 1. Computing device 200 may also relate to software that causes computing device 200 to perform one or more operations.

Computing device 200 is illustrated as including an input/output module 206 that includes a coordinate compensation system 208, and also a display device 210. Display device 210 is an interactive display device, analogous to display device 110 of FIG. 1. Input/output module 206 is representative of functionality relating to processing of inputs and rendering outputs of computing device 200, analogous to input/output module 102 of FIG. 1. Coordinate compensation system 208 leverages the various techniques discussed herein to compensate for interference, analogous to coordinate compensation system 104 of FIG. 1. However, given the presence of input device 202, the interference introduced into the input panel included in display device 210 can be (and typically is) different than the interference introduced into the input panel included in display device 110 of FIG. 1.

In the illustrated example, input device 202 is configured as a keyboard having a QWERTY arrangement of keys although other arrangements of keys are also contemplated. Further, other non-conventional configurations are also contemplated, such as a game controller, configuration to mimic a musical instrument, and so forth. Thus, input device 202 and keys included as part of input device 202 can assume a variety of different configurations to support a variety of different functionality. Each of these different configurations can introduce different interference into the input panel included in display device 210, and thus can each be viewed as a different environment for the input panel as discussed in more detail below.

Input device 202 is physically and communicatively coupled to computing device 200 in this example through use of a flexible hinge 204. Flexible hinge 204 is flexible in that rotational movement supported by the hinge is achieved through flexing (e.g., bending) of the material forming the hinge as opposed to mechanical rotation as supported by a pin, although that embodiment is also contemplated. Further, this flexible rotation may be configured to support movement in one direction (e.g., vertically in the figure) yet restrict movement in other directions, such as lateral movement of input device 202 in relation to computing device 200. This may be used to support consistent alignment of input device 202 in relation to computing device 200, such as to align sensors used to change power states, application states, and so on.

Flexible hinge 204 can be configured in a variety of ways, such as being formed using one or more layers of fabric and including conductors formed as flexible traces to communicatively couple input device 202 to computing device 200 and vice versa. This communication, for instance, can be used to communicate a result of a key press to computing device 200, receive power from computing device 200, perform authentication, provide supplemental power to computing device 200, and so on.

Flexible hinge 204 can be configured to support movement of input device 202 in relation to computing device 200 that is similar to a hinge of a book. For example, rotational movement can be supported by flexible hinge 204 such that input device 200 can be placed against display device 210 of computing device 200 and thereby act as a cover. Input device 202 can also be rotated so as to be disposed against a back of computing device 200, e.g., against a rear housing of computing device 200 that is disposed opposite display device 210 on computing device 200.

Computing device 200 can be coupled to input device 202 in various different manners. In one or more embodiments, input device 202 includes one or more magnetic coupling devices configured to magnetically couple to complementary magnetic coupling devices of computing device 200 through use of one or more magnets. In this way, input device 202 can be physically secured to computing device 200 through use of magnetic attraction. Mechanical coupling protrusions can be configured on input device 202 to extend away from a surface of input device 202, and to be received within complimentary cavities of computing device 200 to promote a mechanical biding between the devices 200 and 202.

It should be noted that although input panels are discussed with reference to FIGS. 1 and 2 as being included in an interactive display device of a computing device, other embodiments are contemplated. For example, an input panel that senses user inputs can be included as part of an interactive display device that is coupled to (rather than included as part of) a computing device. By way of another example, an input panel that senses user inputs can be implemented separately from a display device. Thus, the input panel and the display device can be two separate devices or components and the input panel need not provide any display (e.g., the input panel can be a drawing board without display but that uses touch, pen, or other input technology).

Figure 3:
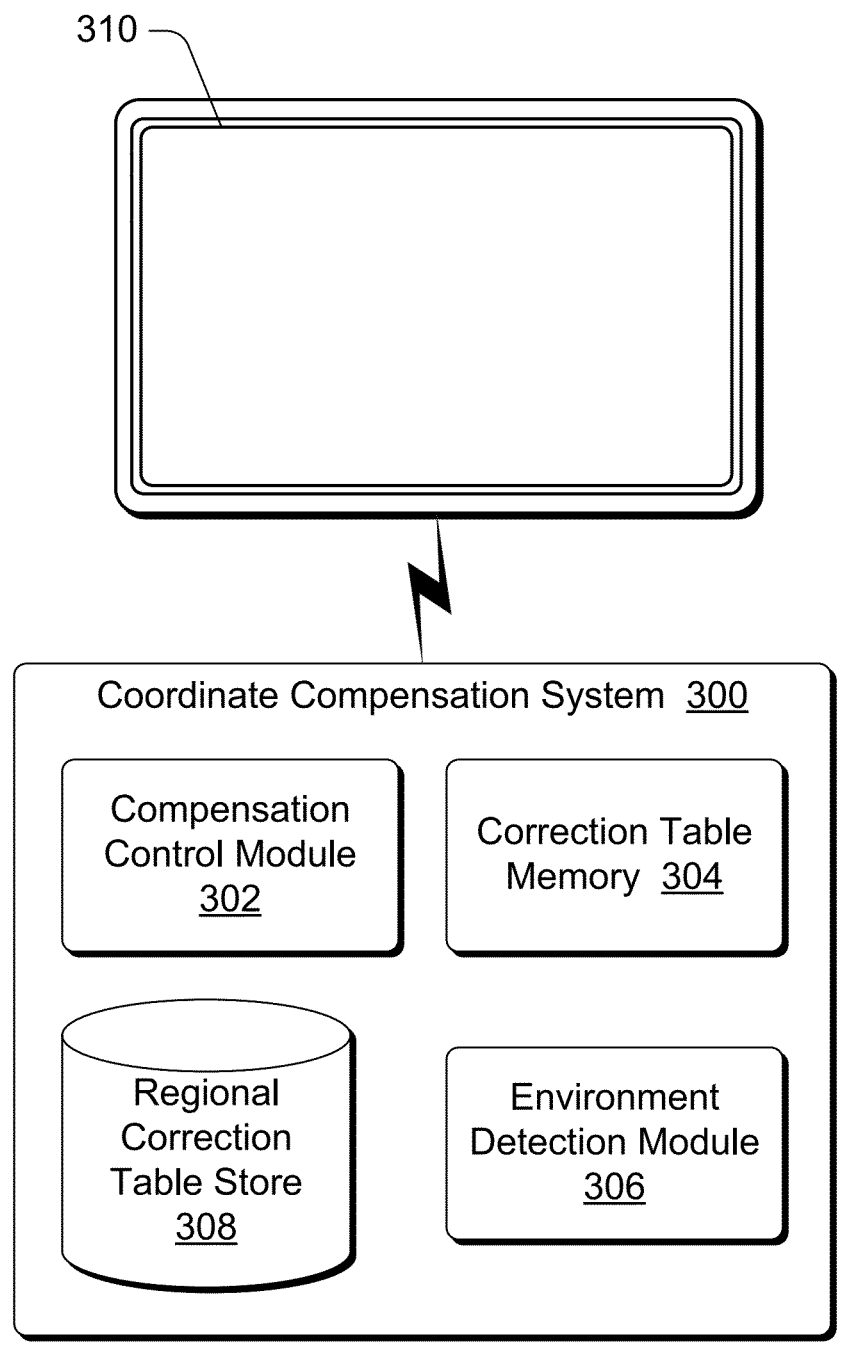
FIG. 3 illustrates an example coordinate compensation system in accordance with one or more embodiments.

FIG. 3 illustrates an example coordinate compensation system 300 in accordance with one or more embodiments. Coordinate compensation system 300 can be, for example, a coordinate compensation system 104 of FIG. 1 or coordinate compensation system 208 of FIG. 2. Coordinate compensation system 300 includes a compensation control module 302, a correction table memory 304, an environment detection module 306, and a regional correction table store 308. Compensation control module 302 applies one or more sets of mappings in correction table memory 304 to sensed locations of an input panel 310 associated with system 300 to compensate or correct for interference introduced into input panel 310. Input panel 310 can be a display device 110 of FIG. 1, a display device 210 of FIG. 2, an input panel separate from a display device, and so forth. Environment detection module 306 detects a current environment of input panel 310 (also referred to as a current environment of a device including input panel 310), allowing an appropriate one or more sets of mappings stored in regional correction table store 308 to be used as the mappings in correction table memory 304. Although particular functionality is discussed herein with reference to particular modules, it should be noted that the functionality of individual modules discussed herein can be separated into multiple modules, and/or at least some functionality of multiple modules can be combined into a single module.

Coordinate compensation system 300 compensates or corrects for interference introduced into input panel 310 by various different devices. The interference introduced into input panel 310 can cause a location of a user input sensed by input panel 310 to be different than the location actually desired to be input by a user. For example, assume input panel 310 senses inputs in a 2-dimensional grid and identifies locations of inputs using an x,y coordinate system. Situations can arise in which the user touches input panel 310 at a location that the user intends to be at 2,3 in the coordinate system, but that is sensed as 5,7 in the coordinate system due to interference. The compensation or correction provided by coordinate compensation system 300 refers to modifying the location sensed by input panel 310 so that the location desired to be input by the user is reported rather than the sensed location (e.g., in the previous location the location 2,3 is reported rather than 5,7).

Input panel 310 can take various forms. Input panel 310 can be, for example, part of interactive display device 110 of FIG. 1 and/or interactive display device 210 of FIG. 2. In one or more embodiments, input panel 310 is referred to as a digitizer and user inputs are provided to input panel 310 via a stylus using electro-magnetic resonance technology. Alternatively, input panel 310 can be implemented using various other input sensing technologies. These input sensing technologies can include capacitive, resistive, and/or electromagnetic based systems that sense touch and/or stylus. These input sensing technologies can also include optical based systems that sense reflection or disruption of light from objects touching (or close to) the surface of the display device, such as Sensor in Pixel (SIP) systems, Infrared systems, optical imaging systems, and so forth. Other types of input sensing technologies can also be used, such as surface acoustic wave systems, acoustic pulse recognition systems, dispersive signal systems, and so forth.

Interference can be introduced into input panel 310 by various different devices attached to (e.g., physically connected to) input panel 310, by various different devices attached to (e.g., physically connected to) a device that includes input panel 310 (e.g., various different devices or components attached to display device 110 of FIG. 1 or display device 210 of FIG. 2), by various different devices in close proximity to (e.g., within a threshold distance of) input panel 310, by various different devices in close proximity to (e.g., with in a threshold distance of) a device that includes input panel 310 (e.g., various different devices or components attached to display device 110 of FIG. 1 or display device 210 of FIG. 2), and so forth. The interference can affect different parts of input panel 310 differently, depending on the nature of the interference as well as the location of the device introducing the interference. Whether a device introduces interference to input panel 310 can also vary based on whether the device is enabled or powered on. For example, a device may not introduce interference to input panel 310 if not enabled and/or not powered on even though the device may be attached to and/or in close proximity to input panel 310.

Various different devices can be attached to the input panel 310 or a device that includes input panel 310, introducing interference into input panel 310. For example, a device (e.g., a keyboard or other controller) can be magnetically attached to the device including input panel 310. By way of another example, devices can be attached to the device including input panel 310 using a universal serial bus (USB) connection, IEEE 1394 connection, and so forth.

Various different devices can also be in close proximity to input panel 310 or a device that includes input panel 310, introducing interference into input panel 310. For example, an additional display device (e.g., television, interactive display device of another computing device, etc.) can be in close proximity to (e.g., within a threshold distance, such as 2 centimeters (cm) of) the input panel 310. By way of another example, a communication device, an output device, an input device, and so forth can be in close proximity to (e.g., within a threshold distance, such as 5 cm of) input panel 310.

Figure 4:
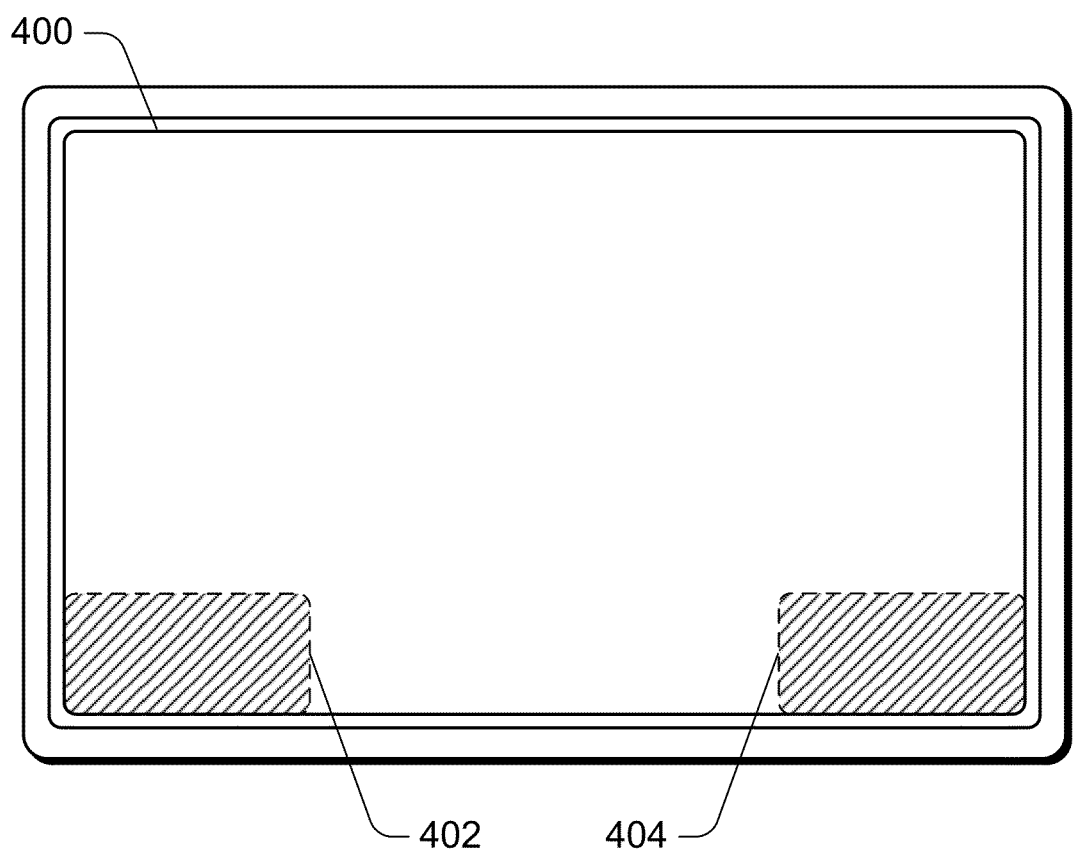
FIG. 4 illustrates an example input panel into which interference is introduced in accordance with one or more embodiments.

FIG. 4 illustrates an example input panel 400 into which interference is introduced in accordance with one or more embodiments. A device introduces interference to input panel 400 at areas 402 and 404, illustrated by cross-hatching in FIG. 4. Portions of input panel 400 not included in areas 402 and 404 are not interfered with (or are interfered with but the interference is small enough that compensation or correction for the interference need not be performed). Different locations in areas 402 and 404 can be affected by different amounts, and compensated for differently by compensation control module 302 as discussed in more detail below. It should be noted that although areas 402 and 404 are illustrated as approximately rectangular areas, the areas affected can have any of a variety of standard geometric shapes (e.g., circles, ovals, triangles, and so forth) and/or other geometric shapes (e.g., freeform shapes).

Returning to FIG. 3, input panel 310 can be situated in different environments at different times. These different environments refer to, for example, the device that includes input panel 310 as well as one or more additional devices that are attached to input panel 310 (or attached to the device that includes input panel 310), one or more additional devices that are in close physical proximity to input panel 310 (or to the device that includes input panel 310), whether these additional devices are enabled or powered on, and so forth.

Environment detection module 306 detects the current environment of input panel 310 and provides an indication of the current environment to compensation control module 302. Compensation control module 302 can optionally select one or more regional correction tables from regional correction table store 308 based on the current environment of input panel 310 and include the selected one or more regional correction tables in correction table memory 304, as discussed in more detail below.

Environment detection module 306 can detect the current environment of the input panel in various different manners. In one or more embodiments, environment detection module 306 registers with an event or other monitoring system of the computing device including input panel 310, and the event system notifies module 306 each time a device is attached to or removed from that computing device, each time a device moves to within or outside of a threshold distance of that computing device, each time such a device is enabled or disabled (or powered on or off), and so forth. Alternatively, environment detection module 306 can detect the current environment of input panel 310 in other manners. For example, environment detection module 306 can poll an operating system registry or other registration store, database, or record to identify when a device is attached to or removed from a computing device including input panel 310, each time a device moves to within or outside of a threshold distance of a computing device including input panel 310, each time such a device is enabled or disabled (or powered on or off), and so forth.

Correction table memory 304 stores one or more sets of input panel location mappings. Each set of input panel location mappings maps each of multiple locations of input panel 310 to another location. Each set of input panel location mappings is discussed herein with reference to a table mapping particular input panel locations to other input panel locations. Alternatively, one or more sets of input panel location mappings can be implemented in other manners, such as using various rules or formulas that are applied to map particular input panel locations to other input panel locations.

In one or more embodiments, correction table memory 304 stores a coarse correction table and a fine correction table. The coarse correction table includes mappings that correct for particular types of interference (e.g., magnetic and metal interference) across all or substantially all of the input panel. The fine correction table corrects for coordinate shift introduced by interference or other discrepancies (e.g., manufacturing or design discrepancies or differences). The coarse correction table is typically (but need not be) a coarser granularity than the fine correction table, providing mappings for broader areas of input panel 310 than the fine correction table.

The coarse and fine correction tables can be generated using any of a variety of different public and/or proprietary techniques. In one or more embodiments, one or more processes are used to analyze input panel 310 and identify the interference and/or coordinate shift experienced at each of multiple locations of input panel 310 for a particular environment. This analysis is typically performed under controlled conditions, such as in a lab or test facility, allowing the interference and/or coordinate shift for the particular environment to be readily identified.

Compensation control module 302 applies the one or more sets of input panel location mappings in correction table memory 304 to sensed input locations of input panel 310 to generate corrected input locations. These corrected input locations compensate or correct for interference introduced into input panel 310. The one or more sets of input panel location mappings in correction table memory 304 can optionally vary over time, being changed by compensation control module 302 based on the environment in which the device including system 300 is situated at any given time, as discussed in more detail below.

Figure 5:
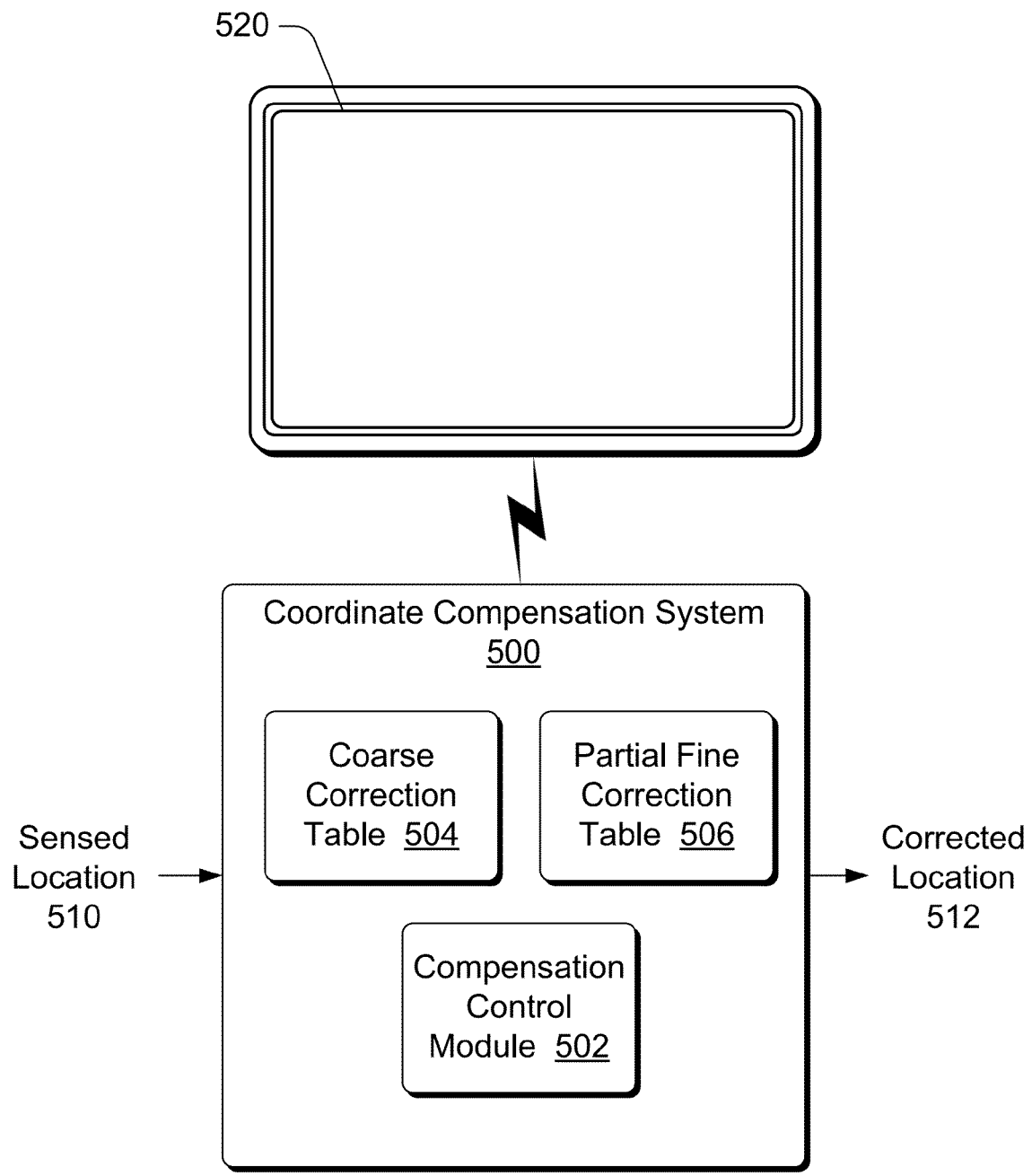
FIG. 5 illustrates an example coordinate compensation system in accordance with one or more embodiments.

FIG. 5 illustrates an example coordinate compensation system 500 in accordance with one or more embodiments. Coordinate compensation system 500 can be, for example, a coordinate compensation system 104 of FIG. 1, a coordinate compensation system 208 of FIG. 2, and/or a coordinate compensation system 300 of FIG. 3. Coordinate compensation system 500 includes a compensation control module 502, a coarse correction table 504, and a partial fine correction table 506. Compensation control module 502 can be, for example, a compensation control module 302 of FIG. 3. Tables 504 and 506 can each be a set of mappings included in a correction table memory 304 of FIG. 3. Coordinate compensation system 500 is associated with an input panel 520. Although particular functionality is discussed herein with reference to particular modules, it should be noted that the functionality of individual modules discussed herein can be separated into multiple modules, and/or at least some functionality of multiple modules can be combined into a single module.

Coordinate compensation system 500 obtains a sensed location 510, which is a location of a user input sensed by input panel 520. System 500 can obtain sensed location 510 in various manners, such as by another component or module passing sensed location 510 to system 500, by another component or module invoking an interface of system 500 to provide sensed location 510, by accessing a known memory location where sensed location 510 is stored, and so forth.

Compensation control module 502 applies the mappings of coarse correction table 504 to generate an intermediate corrected location for sensed location 510. Coarse correction table 504 includes mappings that correct for particular types of interference (e.g., magnetic and metal interference) across all or substantially all of the input panel 520 as discussed above.

The mappings of coarse correction table 504 result in intermediate corrected locations having a particular accuracy. The accuracy of an intermediate corrected location refers to how closely the intermediate corrected location that a sensed location is mapped to is to the location actually desired to be input. Each mapping of a sensed location to an intermediate corrected location in table 504 can have a different accuracy because interference introduced to input panel 520 can affect different portions of input panel 520 differently. The accuracy of each intermediate corrected location can be determined using any of a variety of different public and/or proprietary techniques, and is typically determined as part of the process of analyzing input panel 520 and identifying the interference and/or coordinate shift experienced at each of multiple locations of input panel 520 for a particular environment as discussed above.

Areas of input panel 520 for which the mappings of coarse correction table 504 result in intermediate corrected locations having an accuracy that fails to satisfy a threshold coordinate accuracy (e.g., having an accuracy that is greater than a threshold coordinate accuracy or having an accuracy that is greater than or equal to a threshold coordinate accuracy) have additional mappings included in partial fine correction table 506. Areas of input panel 520 for which the mappings of coarse correction table 504 result in intermediate corrected locations having an accuracy that satisfies the threshold coordinate accuracy (e.g., having an accuracy that is less than a threshold coordinate accuracy or having an accuracy that is less than or equal to a threshold coordinate accuracy) need not, and typically do not, have additional mappings included in partial fine correction table 506. This threshold coordinate accuracy can have different values based on the type of input panel and desired accuracy for the input panel. For example, the threshold coordinate accuracy can be 0.5 millimeters, 1.0 millimeters, and so forth. Thus, partial fine correction table 506 stores mappings for a subset of the intermediate corrected locations resulting from applying coarse correction table 504.

The areas of the input panel for which mappings are included in partial fine correction table 506 can be identified during generation of table 504 and/or table 506. For ease of generation and use of partial fine correction table 506, some mappings can be included in table 506 for intermediate corrected locations having an accuracy that satisfies the threshold coordinate accuracy.

Figure 6:
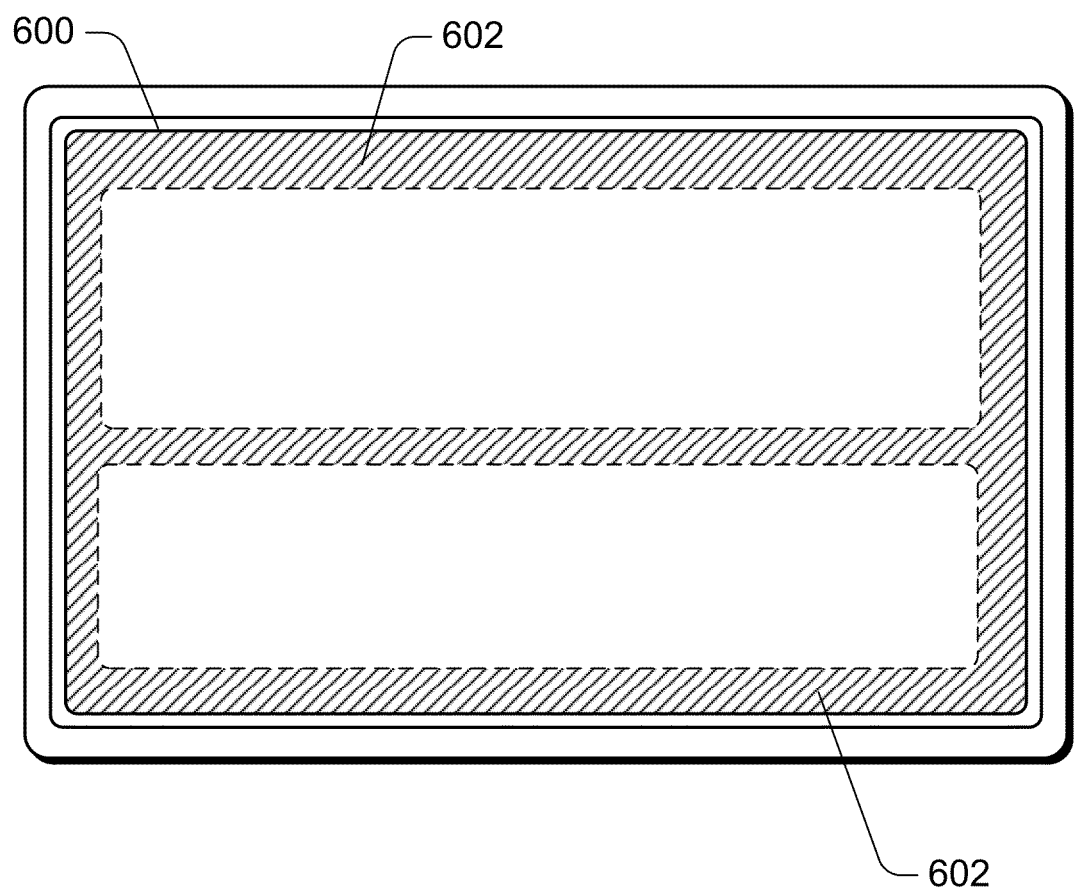
FIG. 6 illustrates an example input panel identifying areas of the input panel for which mappings are included in a partial fine correction table in accordance with one or more embodiments.

FIG. 6 illustrates an example input panel 600 identifying areas of the input panel for which mappings are included in a partial fine correction table in accordance with one or more embodiments. Areas 602 of input panel 600 for which mappings are included in a partial fine correction table are illustrated by cross-hatching in FIG. 6. Portions of input panel 600 not included in areas 602 are not included in a partial fine correction table. The portions of input panel 600 included in areas 602 refer to portions of input panel 600 for which intermediate locations resulting from the mappings of the coarse correction table (e.g., table 504 of FIG. 5) do not satisfy the threshold coordinate accuracy. It should be noted that although areas 602 are illustrated as including multiple approximately rectangular shapes, the areas 602 included in a partial fine correction table can have any of a variety of standard geometric shapes (e.g., circles, ovals, triangles, and so forth) and/or other geometric shapes (e.g., freeform shapes).

Returning to FIG. 5, partial fine correction table 506 includes mappings for less than the entire input panel 520 and typically substantially less than (e.g., oftentimes less than one-half of) the entire input panel 520. Thus, by including mappings for less than the entire input panel 520, the memory used to store table 506 is less than the memory that would be used to include mappings for the entire input panel 520. Although the memory usage is reduced by using partial fine correction table 506, the accuracy of the compensation performed by coordinate compensation system 500 is not reduced because the areas for which mappings are not included in table 506 have a sufficient accuracy as a result of coarse correction table 504.

If a mapping for an intermediate location is included in partial fine correction table 506, then compensation control module 502 applies the mapping of table 506 to generate corrected location 512 for sensed location 510. However, if a mapping for an intermediate location is not included in partial fine correction table 506, then compensation control module 502 uses the intermediate location obtained from coarse correction table 504 as the corrected location 512 for sensed location 510.

Compensation control module 502 can determine the intermediate locations for which partial fine correction table 506 includes mappings in various manners. In one or more embodiments, module 502 performs a lookup or other access for the intermediate location in table 506. If the intermediate location is included in table 506 then there is a corrected location mapped to for the intermediate location that is retrieved by module 502 and used as corrected location 512. However, if the intermediate location is not included in table 506 then there is no corrected location mapped to for the intermediate location, and the intermediate location is used by module 502 as corrected location 512.

Alternatively, compensation control module 502 can identify in other manners whether a mapping for an intermediate location is included in partial fine correction table 506. For example, module 502 can be pre-configured with an indication of which areas or groups of intermediate locations are included in table 506, module 502 can access another module or device to determine which areas or groups of intermediate locations are included in table 506, and so forth. In such situations, module 502 can readily know if a mapping for an intermediate location is included in table 506. If a mapping for an intermediate location is included in table 506 then table 506 is accessed to obtain the mapped to location that is corrected location 512. If a mapping for an intermediate location is not included in table 506 then table 506 need not be accessed and the intermediate location is used as corrected location 512.

In the illustrated example of FIG. 5, a coarse correction table and a partial fine correction table are discussed. Alternatively, any number of correction tables can be included in system 500. For example, three or more tables can be included, such as a coarse correction table, a partial fine correction table, and a partial final correction table. The coarse correction table includes mappings for all or substantially all of input panel 520, the partial fine correction table includes mappings for areas of input panel 520 for which the mappings of the coarse correction table result in corrected locations having an accuracy that fails to satisfy a first threshold coordinate accuracy, and the partial final correction table includes mappings for areas of input panel 520 for which the mappings of the partial fine correction table result in corrected locations having an accuracy that fails to satisfy a second threshold coordinate accuracy (e.g., which may be less than the first threshold coordinate accuracy). Any number of additional correction tables can also be used, each additional correction table including mappings for areas of input panel 520 for which the mappings of one or more other tables (e.g., the previously applied table) fails to satisfy a particular threshold coordinate accuracy.

Coordinate compensation system 500 is discussed with reference to compensation control module 502 applying the mapping of table 506 for an intermediate location if a mapping for the intermediate location is stored in partial fine correction table 506. Alternatively, coarse correction table 504 and partial fine correction table 506 can be combined into a single correction table, with the mappings of partial fine correction table 506 replacing the intermediate locations in coarse correction table 504 as appropriate (e.g., if a mapping for an intermediate location is stored in partial fine correction table 506, that mapping replaces the intermediate location).

Figure 7:
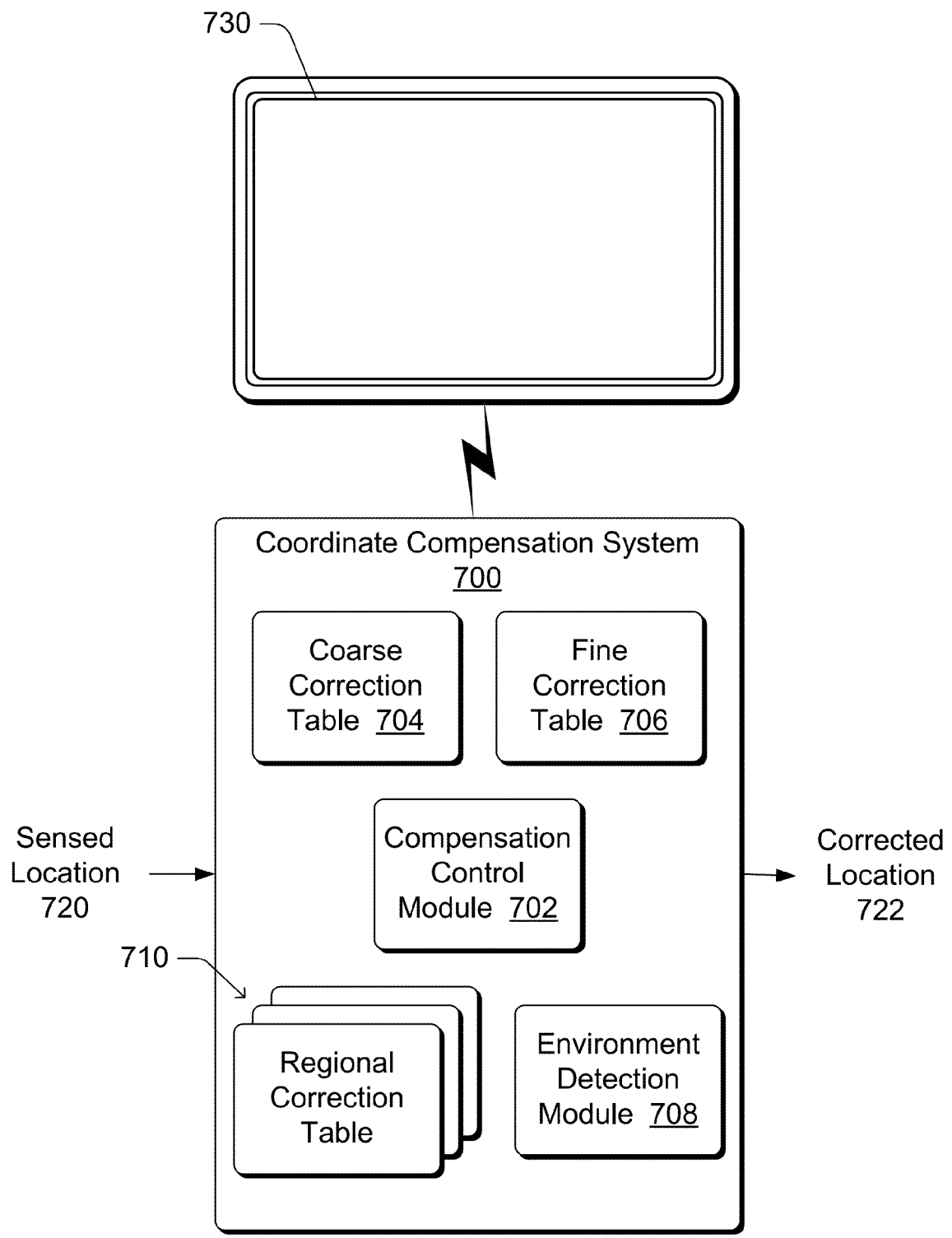
FIG. 7 illustrates an example coordinate compensation system in accordance with one or more embodiments.

FIG. 7 illustrates an example coordinate compensation system 700 in accordance with one or more embodiments. Coordinate compensation system 700 can be, for example, a coordinate compensation system 104 of FIG. 1, a coordinate compensation system 208 of FIG. 2, a coordinate compensation system 300 of FIG. 3 and/or a coordinate compensation system 500 of FIG. 5. Coordinate compensation system 700 includes a compensation control module 702, a coarse correction table 704, and a fine correction table 706. Compensation control module 702 can be, for example, a compensation control module 302 of FIG. 3. Tables 704 and 706 can each be a set of mappings included in a correction table memory 304 of FIG. 3. Coordinate compensation system 700 is associated with an input panel 730. Although particular functionality is discussed herein with reference to particular modules, it should be noted that the functionality of individual modules discussed herein can be separated into multiple modules, and/or at least some functionality of multiple modules can be combined into a single module.

Fine correction table 706 can be a partial fine correction table, such as a partial fine correction table 506 of FIG. 5, that includes mappings for areas of input panel 730 for which the mappings of coarse correction table 704 result in intermediate corrected locations having an accuracy that fails to satisfy a threshold coordinate accuracy as discussed above. Alternatively, fine correction table 706 can include mappings for all or substantially all of the areas of input panel 730 regardless of the accuracy of the intermediate corrected locations provided by coarse correction table 704.

Coordinate compensation system 700 also includes an environment detection module 708 and one or more regional correction tables 710. Environment detection module 708 can be, for example, an environment detection module 306 of FIG. 3. Regional correction tables 710 can be maintained, for example, in a regional correction table store 308 of FIG. 3.

Input panel 730 can be situated in various different environments, and the current environment at any given time can be identified by environment detection module 708 as discussed above. Different environments have different corresponding correction tables that are maintained as regional correction tables 710. Each different environment can correspond to a different regional correction table 710, or multiple environments can correspond to the same regional correction table 710.

The coarse and fine correction tables 704, 706 corresponding to a particular environment are identified as a baseline or baseline tables. This particular environment can be any environment in which input panel 730 can be situated, such as an environment in which input panel 730 is included in an interactive display device of a computing device with no devices attached to and/or in close proximity to the computing device. Each regional correction table 710 identifies changes to make to the baseline tables in order to account for differences in interference introduced in the environment corresponding to the table 710. For example, the regional correction table 710 for an environment in which a keyboard is attached to the computing device including the interactive display device and input panel 730 can identify different mappings, relative to the baseline, to use for particular areas of input panel 730 due to the interference introduced to input panel 730 by the keyboard.

A regional correction table 710 can identify changes to make to the baseline in a variety of different manners. For example, a regional correction table 710 can identify one or more mappings that are to replace the mappings included in a baseline table. By way of another example, a regional correction table 710 can identify changes to make to a mapping included in a baseline table (e.g., an amount to increase or decrease an x dimension of an x,y coordinate, an amount to increase or decrease a y dimension of an x,y coordinate, etc.).

Regional correction tables 710 can be generated by generating coarse and fine correction tables for different environments using any of a variety of different public and/or proprietary techniques, analogous to the coarse and fine correction tables discussed above. For example, one or more processes are used to analyze the input and identify the interference and/or coordinate shift experienced at each of multiple locations of input panel 730 for each of multiple different environments (e.g., identify the interference and/or coordinate shift experienced at each of multiple locations of input panel 730 for an interactive display device alone, identify the interference and/or coordinate shift experienced at each of multiple locations of input panel 730 for an interactive display device with a keyboard attached, identify the interference and/or coordinate shift experienced at each of multiple locations of input panel 730 for an interactive display device with a USB flash drive or power supply unit inserted, etc.).

Given the coarse and fine correction tables for a particular environment, a regional correction table corresponding to that particular environment can readily be determined based on the baseline tables as well as the coarse and fine correction tables for the particular environment. In one or more embodiments, for each location of input panel 730 mapped in a baseline table, a check is made as to whether that location maps to the same location in both the baseline tables and the tables for the particular environment. If both the baseline tables and the tables for the particular environment map to the same location, then the mapping need not be included in the regional correction table; however, if the baseline tables and the tables for the particular environment map to different locations then the mapping included in the tables for the particular environment (e.g., the mappings in both the coarse and fine correction tables for the particular environment) is included in the regional correction table.

Alternatively, the regional correction table can be generated in other manners. In one or more embodiments, the accuracy of the baseline in a different environment is determined. For example, the baseline can correspond to an environment in which no devices are attached to and/or in close proximity to the device including an interactive display device, and the accuracy of the baseline can be determined for a new environment in which a keyboard is attached to the device including the interactive display device. For areas of each table in the baseline having an accuracy that fails to satisfy a threshold coordinate accuracy (e.g., having an accuracy that is greater than a threshold coordinate accuracy or having an accuracy that is greater than or equal to a threshold coordinate accuracy) for the new environment, new mappings for the locations in those areas are identified and included in a regional correction table corresponding to the new environment. These new mappings can be generated by generating coarse and fine correction tables for the new environment using any of a variety of different public and/or proprietary techniques, analogous to generating the coarse and fine correction tables discussed above.

Figure 8:
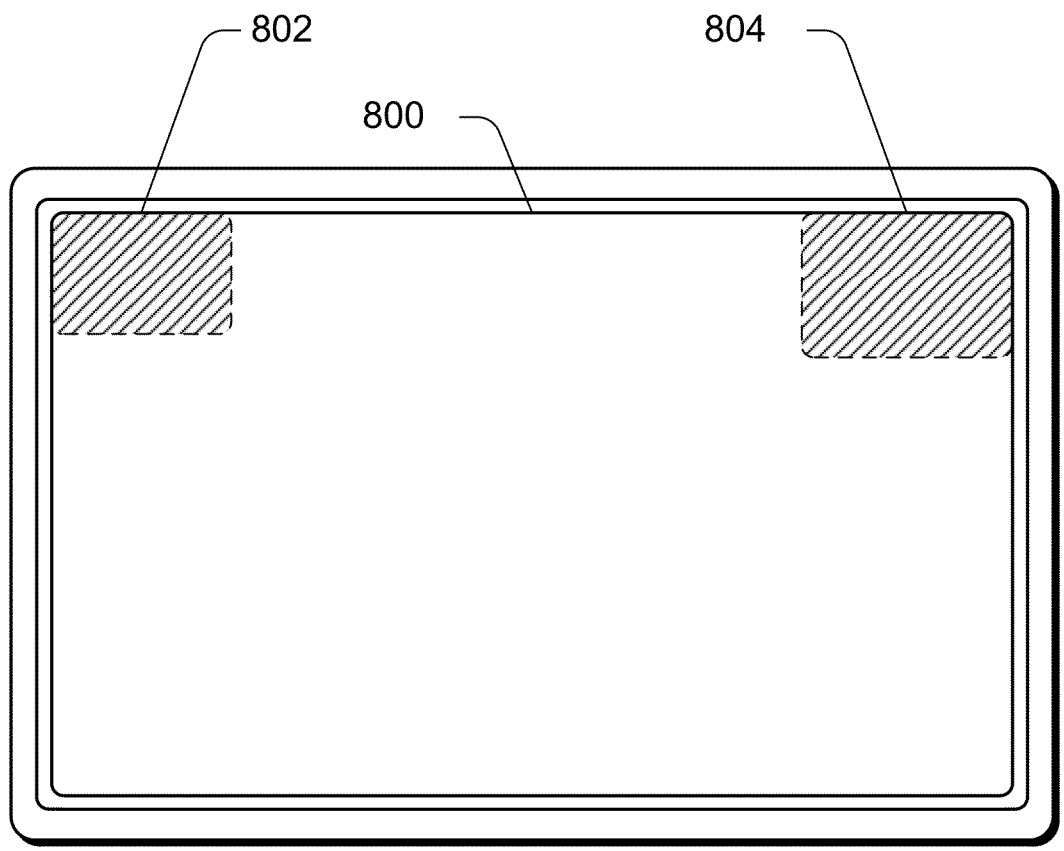
FIG. 8 illustrates an example input panel identifying areas of the input panel for which mappings are included in a regional correction table in accordance with one or more embodiments.

FIG. 8 illustrates an example input panel 800 identifying areas of the input panel for which mappings are included in a regional correction table in accordance with one or more embodiments. Areas 802 and 804 of input panel 800 for which mappings are included in a regional correction table are illustrated by cross-hatching in FIG. 8. Portions of input panel 800 not included in areas 802 and 804 are not included in the regional correction table. The portions of input panel 800 included in areas 802 and 804 refer to portions of input panel 800 for which the accuracy of mappings for the baseline do not satisfy the threshold coordinate accuracy for the environment corresponding to the regional correction table. It should be noted that although areas 802 and 804 are illustrated as approximately rectangular areas, the areas 802 and 804 included in a regional correction table can have any of a variety of standard geometric shapes (e.g., circles, ovals, triangles, and so forth) and/or other geometric shapes (e.g., freeform shapes).

Returning to FIG. 7, compensation control module 702 receives an indication of the current environment from environment detection module 708, and obtains the regional correction table 710 corresponding to the current environment. The regional correction table 710 can include mappings for a coarse correction table and/or a fine correction table. Module 702 replaces the appropriate mappings in the coarse and fine correction tables 704 and 706 with the mappings in the obtained regional correction table 710.

Thus, for each different environment in which the device including input panel 730 is situated (other than the environment corresponding to the baseline), the set of mappings in the regional correction table 710 corresponding to the environment are combined with the set of mappings in the coarse and/or fine correction tables. The regional correction table 710 can thus be viewed as being stitched together with the coarse and/or fine correction tables.

Coordinate compensation system 700 obtains a sensed location 720, which is a location of a user input sensed by input panel 730. System 700 can obtain sensed location 720 in various manners, such as by another component or module passing sensed location 720 to system 700, by another component or module invoking an interface of system 700 to provide sensed location 720, by accessing a known memory location where sensed location 720 is stored, and so forth.

After updating coarse correction table 704 and/or fine correction table 706 for a particular environment based on the regional correction table 710 corresponding to that particular environment, compensation control module 702 applies the mappings of coarse correction table 704 to generate an intermediate corrected location for sensed location 720. Coarse correction table 704 includes mappings that correct for particular types of interference (e.g., magnetic and metal interference) across all or substantially all of input panel 730 as discussed above.

Compensation control module 702 applies the mappings of fine correction table 706 to the intermediate corrected location to obtain the corrected location 722 for the sensed location 720. The fine correction table corrects for coordinate shift introduced by interference or other discrepancies (e.g., manufacturing or design discrepancies or differences) as discussed above. Alternatively, if fine correction table 706 is a partial fine correction table, then module 702 does not apply the mappings of table 706 to the intermediate if a mapping for the intermediate location is not included in table 706.

It should be noted that regional correction tables 710 are maintained in a regional correction table store, such as store 308 of FIG. 3. The regional correction table store can be (but need not be) separate from the correction table memory in which the coarse and fine correction tables 704 and 706 are maintained, such as correction table memory 304 of FIG. 3. The regional correction table store can be maintained on a different device or different type of memory than the correction table memory. Thus, for example, expensive high-speed memory can be used for the correction table memory, but slower less-expensive Flash memory or magnetic disk storage can be used for the regional correction table store.

In the illustrated example of FIG. 7, a coarse correction table and a fine correction table are discussed. Alternatively, any number of correction tables can be included in system 700. For example, three or more tables can be included, such as a coarse correction table, a fine correction table, and a final correction table. Each table can provide a finer granularity than one or more other tables (e.g., the previously applied table). For example, the coarse correction table may be a coarse granularity and provide mappings for broad areas of input panel 730, the fine correction table can be a finer granularity that provides mappings for smaller areas of input panel 730 than the coarse correction table, and the final correction table can be an even finer granularity that provides mappings for smaller areas of input panel 730 than either the coarse correction table or the fine correction table.

Figure 9:
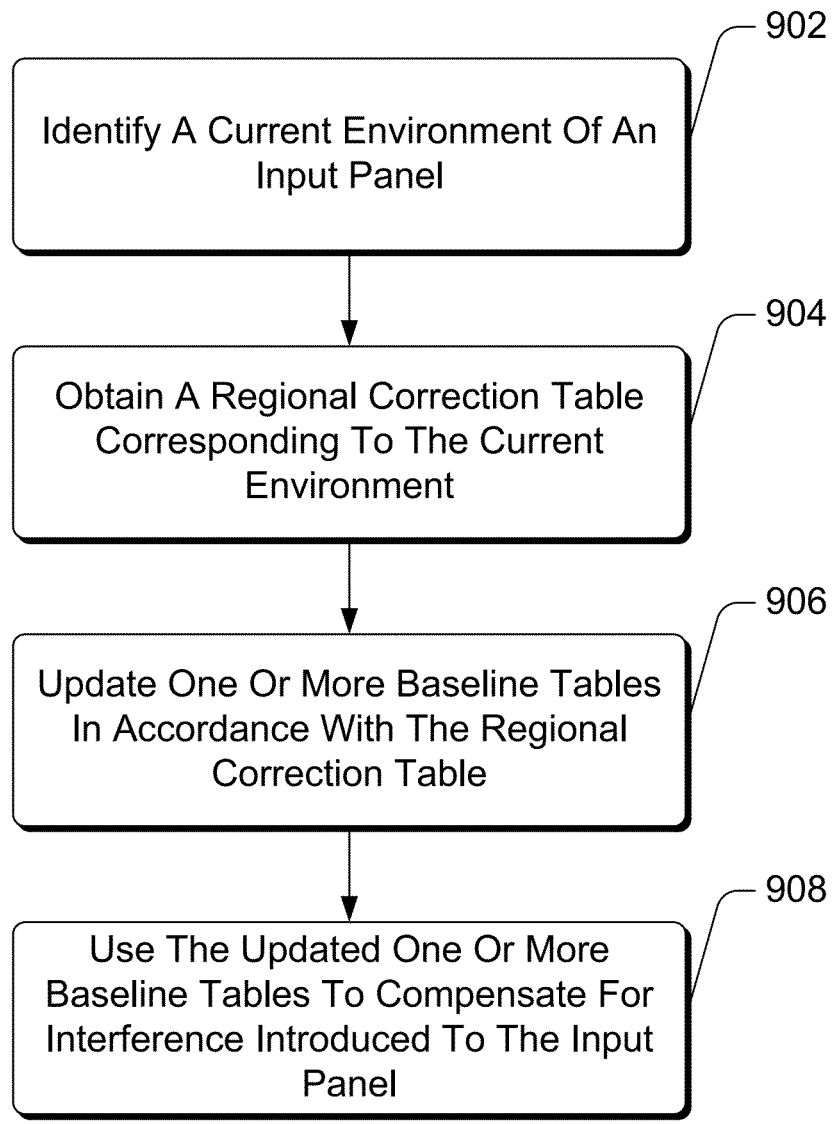
FIG. 9 is a flowchart illustrating an example process for a device implementing input location correction tables for input panels in accordance with one or more embodiments.

FIG. 9 is a flowchart illustrating an example process 900 for a device implementing input location correction tables for input panels in accordance with one or more embodiments. Process 900 is carried out by a coordinate compensation system, such as system 104 of FIG. 1, system 208 of FIG. 2, system 300 of FIG. 3, system 500 of FIG. 5, or system 700 of FIG. 7, and can be implemented in software, firmware, hardware, or combinations thereof. Process 900 is shown as a set of acts and is not limited to the order shown for performing the operations of the various acts. Process 900 is an example process for implementing input location correction tables for input panels; additional discussions of implementing input location correction tables for input panels are included herein with reference to different figures.

In process 900, a current environment of an input panel is identified (act 902). The input panel can be situated in various different environments as discussed above. The current environment of the input panel can also be referred to as the current environment of a display device and/or computing device including the input panel.

A regional correction table corresponding to the current environment is obtained (act 904). The regional correction table identifies changes to make to one or more baseline tables in order to account for differences in interference introduced into the input panel in the corresponding environment, as discussed above.

The one or more baseline tables are updated in accordance with the changes in the regional correction table (act 906). The one or more baseline tables can be updated in different manners as discussed above, such as replacing mappings in the one or more baseline tables with mappings in the regional correction table, modifying mappings in the one or more baseline tables based on indications in the regional correction table, and so forth.

The updated one or more baseline tables are used to compensate for interference introduced into the input panel (act 908). The updated one or more baseline tables are applied to a sensed location to generate a corrected location, as discussed above.

Figure 10:
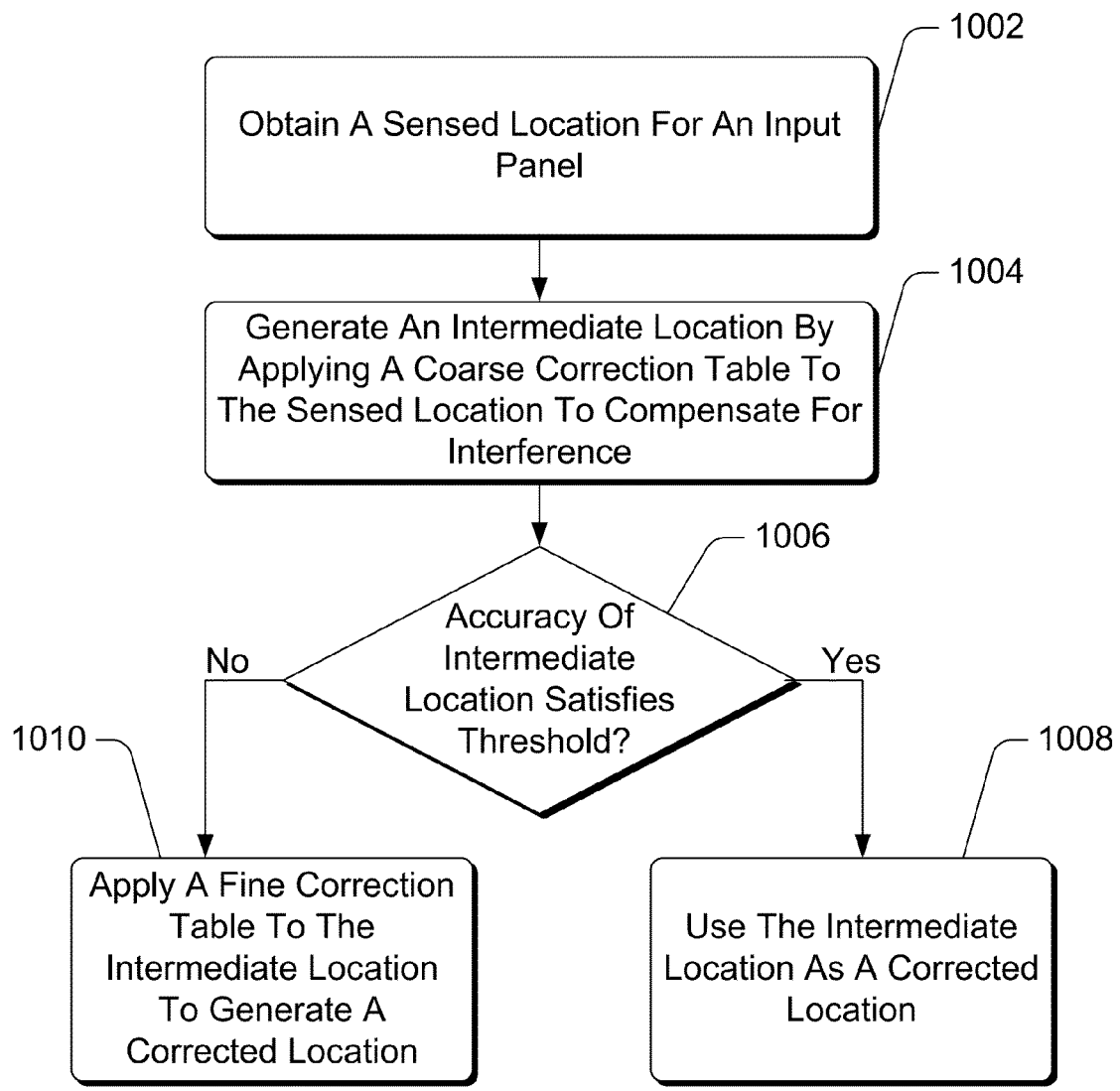
FIG. 10 is a flowchart illustrating another example process for a device implementing input location correction tables for input panels in accordance with one or more embodiments.

FIG. 10 is a flowchart illustrating an example process 1000 for a device implementing input location correction tables for input panels in accordance with one or more embodiments. Process 1000 is carried out by a coordinate compensation system, such as system 104 of FIG. 1, system 208 of FIG. 2, system 300 of FIG. 3, system 500 of FIG. 5, or system 700 of FIG. 7, and can be implemented in software, firmware, hardware, or combinations thereof. Process 1000 is shown as a set of acts and is not limited to the order shown for performing the operations of the various acts. Process 1000 is an example process for implementing input location correction tables for input panels; additional discussions of implementing input location correction tables for input panels are included herein with reference to different figures.

In process 1000, a sensed location for an input panel is obtained (act 1002). The sensed location can be obtained in different manners, as discussed above.

An intermediate panel location is generated by applying a coarse correction table to the sensed location to compensate for interference introduced to the input panel (act 1004). Interference can be introduced into the input panel by a variety of different devices, as discussed above.

Process 1000 then proceeds based on whether the accuracy of the intermediate location generated in act 1004 satisfies a threshold coordinate accuracy (act 1006). If the intermediate location satisfies the threshold coordinate accuracy, then the intermediate location is used as a corrected location for the sensed location (act 1008), and is output or otherwise provided as the user input location based on the sensed location.

However, if the intermediate location does not satisfy the threshold coordinate accuracy, then a corrected location is generated by applying a fine correction table to the intermediate location (act 1010). The corrected location is output or otherwise provided as the user input location based on the sensed location.

Various actions performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 11:
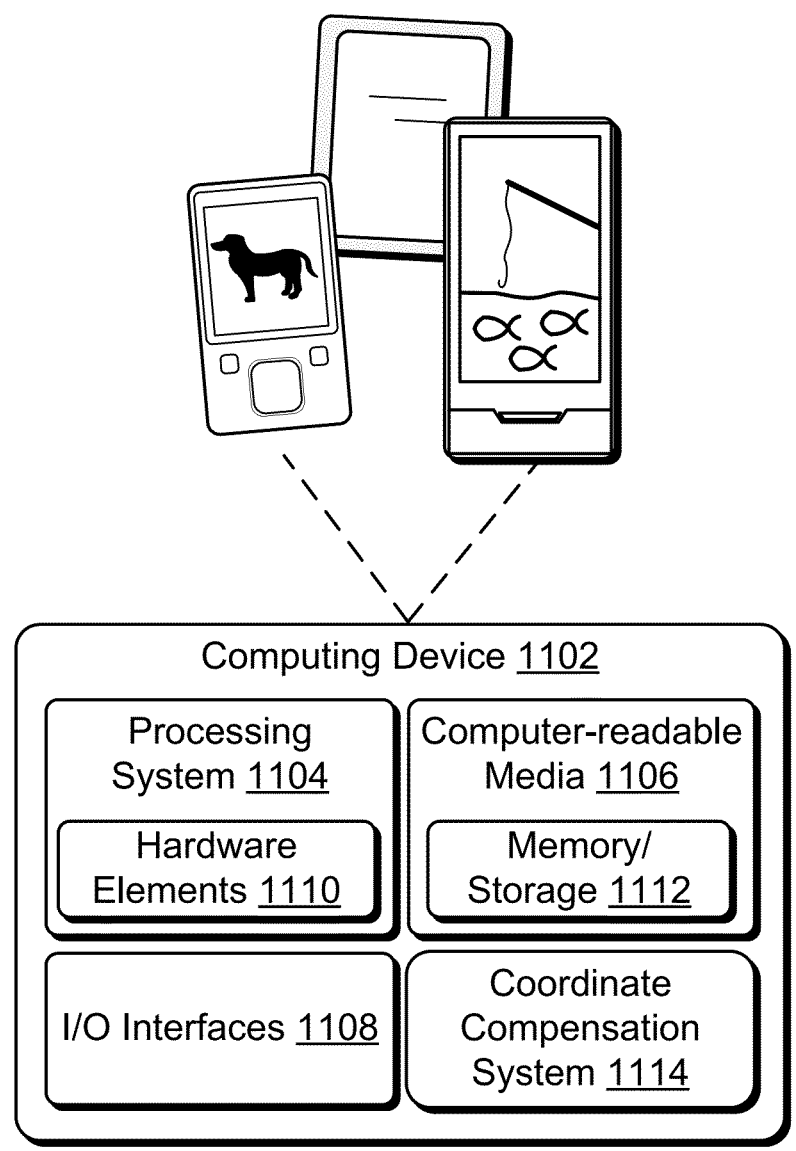
FIG. 11 illustrates an example system generally that includes an example computing device that is representative of one or more computing systems and/or devices that may implement the various techniques described herein.

FIG. 11 illustrates an example system generally at 1100 that includes an example computing device 1102 that is representative of one or more computing systems and/or devices that may implement the various techniques described herein.

The computing device 1102 may, for example, be configured to assume a mobile configuration through use of a housing formed and sized to be grasped and carried by one or more hands of a user, illustrated examples of which include a mobile phone, mobile game and music device, and tablet computer although other examples are also contemplated.

The example computing device 1102 as illustrated includes a processing system 1104, one or more computer-readable media 1106, and one or more I/O interfaces 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware elements 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone to receive voice or other audible inputs, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways to support user interaction.

Coordinate compensation system 1114 is representative of a coordinate compensation system that leverages the various techniques discussed herein to compensate for interference introduced into an input panel of computing device 1102 by various different devices attached to computing device 1102 and/or in close proximity to computing device 1102. Coordinate compensation system 104 can be, for example, a coordinate compensation system 104 of FIG. 1, a coordinate compensation system 208 of FIG. 2, a coordinate compensation system 300 of FIG. 3, a coordinate compensation system 500 of FIG. 5, or a coordinate compensation system 700 of FIG. 7, and so forth.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or storage of information that is tangible in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

Furthermore, although illustrated as a single computing device, computing device 1102 can be coupled to one or more additional computing devices via the Internet or other data communication network. These additional computing devices can be, for example, a cloud of one or more server computers. Various aspects of the coordinate compensation system 1114 and/or other modules of computing device 1102 can be provided by and/or processing performed on one or more servers or other computing devices that are remote from computing device 1102.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
a coarse correction table storing mappings of sensed locations of an input panel to intermediate corrected locations that compensate for interference introduced into the input panel;
a partial fine correction table storing mappings of particular intermediate corrected locations to corrected locations, the particular intermediate corrected locations comprising a subset of the intermediate corrected locations having an accuracy that fails to satisfy a threshold coordinate accuracy; and
a compensation control module configured to apply to a sensed location of the input panel the mappings of the coarse correction table and the mappings of the partial fine correction table to generate a corrected location that compensates for interference introduced into the input panel.

2. A system as recited in claim 1, the coarse correction table and/or partial fine correction table being a combination of a baseline table and a regional correction table corresponding to a current environment of the input panel.

3. A system as recited in claim 1, the coarse correction table storing mappings for substantially all locations of the input panel.

4. A system as recited in claim 1, the partial fine correction table excluding mappings for intermediate corrected locations that satisfy the threshold coordinate accuracy.

5. A system as recited in claim 1, further comprising an additional table storing mappings of locations of the partial fine correction table that do not satisfy an additional threshold coordinate accuracy.

6. A system as recited in claim 1, the input panel comprising a digitizer that receives inputs provided via a stylus using electro-magnetic resonance.

7. A system as recited in claim 1, the compensation control module being configured to apply the mappings of the coarse correction table to the sensed location to generate an intermediate location, and to apply the mappings of the partial fine correction table to the intermediate location in response to a mapping for the intermediate location being included in the partial fine correction table to generate the corrected location.

8. A system as recited in claim 7, the compensation control module being further configured to use the intermediate location as the corrected location in response to no mapping for the intermediate location being included in the partial fine correction table.

9. A method comprising:
identifying a current environment of an input panel;
obtaining a regional correction table corresponding to the current environment of the input panel, the regional correction table identifying changes to make to one or more baseline tables that store mappings to generate, based on a sensed location of the input panel, a corrected location that compensates for interference introduced into the input panel; and
updating the one or more baseline tables in accordance with the changes identified in the regional correction table.

10. A method as recited in claim 9, the one or more baseline tables including a coarse correction table that includes mappings that correct for a particular type of interference, and a fine correction table that corrects for coordinate shift introduced by the particular type of interference.

11. A method as recited in claim 10, the particular type of interference comprising magnetic and metal interference.

12. A method as recited in claim 10, the fine correction table comprising a partial fine correction table that stores mappings of intermediate locations mapped to by the coarse correction table having an accuracy that fails to satisfy a threshold coordinate accuracy.

13. A method as recited in claim 9, the input panel comprising a digitizer that receives inputs provided via a stylus using electro-magnetic resonance.

14. A method as recited in claim 9, the one or more baseline tables storing mappings to generate corrected locations that compensate for interference introduced into the input panel in an environment in which no additional devices are attached to a computing device including the input panel and no additional devices are within a threshold distance of the input panel.

15. A method as recited in claim 14, the current environment comprising the computing device and a keyboard magnetically attached to the computing device.

16. A method as recited in claim 9, the obtaining comprising retrieving the regional correction table from a memory separate from a correction table memory in which the one or more baseline tables are stored, and the updating comprising updating the one or more baseline tables in the correction table memory.

17. A method as recited in claim 9, the current environment comprising a device including the input panel and one or more additional devices attached to the device.

18. A method as recited in claim 9, the current environment comprising one or more additional devices within a threshold distance of the input panel.

19. A method as recited in claim 9, the current environment comprising a device including the input panel and one or more additional devices that are enabled and attached to and/or within a threshold distance of the device.

20. A computing device comprising:
  one or more processors; and
  one or more computer-readable storage media having stored thereon multiple instructions that, when executed by the one or more processors, cause the one or more processors to:
    identify a current environment of the computing device;
    obtain a regional correction table corresponding to the current environment of the computing device, the regional correction table identifying changes to make to baseline tables including a coarse correction table and a partial fine correction table, the baseline tables storing mappings to generate, based on a sensed location of an input panel of the computing device, a corrected location that compensates for magnetic and metal interference introduced to the input panel, the partial fine correction table storing mappings of intermediate locations mapped to by the coarse correction table having an accuracy that fails to satisfy a threshold coordinate accuracy; and
    update the one or more baseline tables in accordance with the changes identified in the regional correction table.

* * * * *